(12) United States Patent
Yoshida et al.

(10) Patent No.: US 7,936,845 B2
(45) Date of Patent: May 3, 2011

(54) APPARATUS, METHOD AND COMPUTER-READABLE RECORDING MEDIUM FOR SETTING SIGNAL CORRECTION-MAGNITUDE

(75) Inventors: Hiroshi Yoshida, Fukuoka (JP); Kouichi Maeda, Fukuoka (JP); Mamoru Suematsu, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 773 days.

(21) Appl. No.: 11/907,396

(22) Filed: Oct. 11, 2007

(65) Prior Publication Data

US 2008/0095219 A1   Apr. 24, 2008

(30) Foreign Application Priority Data

Oct. 18, 2006   (JP) ................................ 2006-284254

(51) Int. Cl.
*H04L 27/00* (2006.01)
*H03K 9/00* (2006.01)

(52) U.S. Cl. ........................................ 375/316; 375/343

(58) Field of Classification Search .................. 375/343, 375/316
See application file for complete search history.

(56) References Cited

U.S. PATENT DOCUMENTS

2006/0179216 A1* 8/2006 Chikamichi ................. 711/112

FOREIGN PATENT DOCUMENTS

| JP | 2004-15622 | 1/2004 |
| JP | 2004-242310 | 8/2004 |
| JP | 2005-269170 | 9/2005 |

* cited by examiner

*Primary Examiner* — Chieh M. Fan
*Assistant Examiner* — Freshteh N Aghdam
(74) *Attorney, Agent, or Firm* — Fujitsu Patent Center

(57) ABSTRACT

Equal-length group data obtained by grouping together slot pairs connected by a wiring pattern of equal length is stored in advance. Error rate is determined while changing a pre-emphasis (PE) setting value and an equalizer (EQ) setting value of a signal transmitted between a specified slot pair. The slot pairs belonging to the same equal-length group as the specified slot pair are selected based on the equal-length group data, and optimum PE and EQ setting values, determined based on the error rate, are set for the signals transmitted between the selected slot pairs.

11 Claims, 17 Drawing Sheets

TRANSMITTING SIDE

RECEIVING SIDE

TRANSMITTING SIDE

RECEIVING SIDE

TRANSMITTING SIDE

RECEIVING SIDE

TRANSMITTING SIDE

RECEIVING SIDE

APPARATUS, METHOD AND COMPUTER-READABLE RECORDING MEDIUM FOR SETTING SIGNAL CORRECTION-MAGNITUDE

BACKGROUND OF THE INVENTION

1. Field of the Invention

The present invention relates to an apparatus, a method and a computer-readable recording medium for setting correction magnitudes of a signal transmitted via a signal transmission channel connecting each pair of a plurality of pairs of communication devices.

2. Description of the Related Art

Electronic devices such as information processing devices, transmitters and the like, that perform predetermined processes by receiving and outputting signals are generally built using a plurality of communication devices connected by a backboard (hereinafter, "BWB"). Each communication device that makes up the electronic device is normally realized by a printed board that includes circuits that receive and send signals and integrated circuits that perform predetermined processes. The backboard includes a plurality of slots for insertion of input terminals and output terminals of the communication devices. The slots are connected to each other through the wiring pattern, and the signals are exchanged among the communication devices through the slots.

FIG. 16 is a schematic drawing of the backboard. The backboard shown in FIG. 16 has eight slots (slots #1 to #8). Pairs of slots #1 and #2, slots #3 and #4, slots #5 and #6, and slots #7 and #8 are connected by the wiring pattern. Each pair of slots is shown to be connected by a single wiring pattern in FIG. 16. However, as the signals are transmitted in both directions between a pair of slots, there are two wiring patterns connecting each pair of slots.

With the increasing demand for higher processing speeds of electronic devices, it has become inevitable to transmit the signals at increased speeds. This has resulted in quality degradation (for example, degradation of bit error rate) of the transmission signals produced by the printed board and BWB. Transmission channel properties such as dielectric loss of the insulating material used in the printed board and BWB are attributable to the degradation of transmission signals.

Pre-emphasis is one of the methods for correcting degradation of the transmission signals, wherein signals are corrected when they are transmitted. Another method for correcting degradation is called equalizer, wherein signals are corrected when they are received.

FIGS. 17A to 17D are drawings of waveforms for explaining pre-emphasis. FIG. 17A is a drawing of a waveform determined on the transmitting side, and FIG. 17B is a drawing of a waveform determined at the receiving side in a case when the signals are transmitted without first correcting them. As can be seen from FIGS. 17A and 17B, when the signals are transmitted without first correcting them, the shoulder of the waveform falls on the receiving side due to the degradation of the quality of the transmission signals caused by the transmission channel properties. To counter this, as shown in FIG. 17C, the shoulder portion of the transmission signals on the transmission side is emphasized by the pre-emphasis. This results in correction of the waveform on the receiving side, as shown in FIG. 17D.

FIGS. 18A to 18D are drawings of waveforms for explaining equalizer. Similar to FIGS. 17A and 17B, FIGS. 18A and 18B are drawings of waveforms determined at the transmitting side and the receiving side, respectively, in the case when the signals are transmitted without first correcting them. In the equalizer method, the transmission signals received on the receiving side are emphasized at the shoulder portion. As a result, a corrected waveform is obtained on the receiving side, as shown in FIG. 18D.

Thus, the quality of the transmission signals can be corrected by subjecting the transmission signals to pre-emphasis (hereinafter, "PE") on the transmitting side or equalizer (hereinafter, "EQ") on the receiving side. However, the magnitudes by which the transmission signals are to be corrected (emphasized) need to be determined and set on the transmitting side and the receiving side.

The optimum magnitudes of correction (hereinafter, "correction magnitudes") vary according to the length of the wiring pattern between two slots. This necessitates the maintenance person to determine the correction magnitudes that correspond to least error rate of the transmission signals by a tedious process of manually changing the PE and EQ correction magnitudes repeatedly and transmitting signals between the printed boards, and set the settings corresponding to the correction value on the receiving side and the transmitting side.

There are known technologies (for example, Japanese Patent Application Laid-open No. 2004-15622) for reducing the effort for determining the optimum setting value during initial settings of the electronic device, for example, by an automatic process of determining an optimum setting value by transmitting signals between the slots while automatically changing the setting values, and by setting the determined optimum setting value in the processing unit that performs the correction of the signals.

However, the BWBs in recent years have a full mesh topology wherein any two slots can be paired up. However, which two slots will be paired up depends on how the electronic device is to be used. Therefore, the maintenance person needs to determine the optimum setting values for the slots that will be paired up.

Applying the conventional technology to the BWB having a full mesh topology entails determining the optimum setting values for all the slot pairs, considerably increasing the time taken for the initial settings process.

Further, with prolonged use of the electronic device, the pattern impedance can change from the original value due to aging degradation or environmental changes, causing the quality of the signals transmitted between the slots of the printed board and BWB to deteriorate.

This necessitates once again determining the optimum PE and EQ setting values. Changing the PE and EQ setting values when the electronic device is running causes further degradation of the signals. As an alternative, the electronic device can be temporarily stopped to reconfigure the settings. However, stopping the electronic device will stop the task or the service the electronic device is used for in an affair, and if the number of slots on the BWB is large, the down time will be all the more longer, adversely affecting affair work.

There is a need to detect and set an optimum correction value for the signals in a short time.

SUMMARY OF THE INVENTION

It is an object of the present invention to at least partially solve the problems in the conventional technology.

According to one aspect of the present invention, there is provided an apparatus for setting signal correction magnitude that sets correction magnitudes of a signal transmitted via a signal transmission channel when there are a plurality of communication device pairs each of which is connected by the signal transmission channel. The apparatus includes a group data storage unit that stores equal-length group data obtained by grouping together the signal transmission channels that are of equal length from among a plurality of signal transmission channels; an error-data retrieving unit that retrieves error rates as an abnormal generation status while changing the correction magnitude of the signal when one of the signal transmission channel is specified from among the plurality of the signal transmission channels; and a signal correction-magnitude setting unit that selects a signal transmission channel having the same length as that of the specified signal transmission channel based on the equal-length group data stored in the group data storage unit, and sets the correction magnitudes of the signals transmitted via the selected signal transmission channel based on the error rate retrieved by the error-data retrieving unit.

According to another aspect of the present invention, there is provided a method for setting signal correction magnitude that sets correction magnitudes of a signal transmitted via a signal transmission channel when there are a plurality of communication device pairs each of which is connected by the signal transmission channel. The method includes storing equal-length group data obtained by grouping together the signal transmission channels that are of equal length from among a plurality of signal transmission channels; retrieving error rates as an abnormal generation status while changing the correction magnitude of the signal when one of the signal transmission channel is specified from among the plurality of the signal transmission channels; and selecting the signal transmission channels having the same length as that of the specified signal transmission channel based on the equal-length group data stored in the storing, and setting the correction magnitudes of the signals transmitted via the selected signal transmission channel based on the error rate retrieved in the retrieving.

According to still another aspect of the present invention, there is provided a computer-readable recording medium that stores therein a signal correction-magnitude setting program that causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described below with reference to the accompanying drawings. The embodiments of the present invention are explained by applying the present invention to signal transmitting apparatuses that transmit and receive signals through a printed board and are connected by a backboard (BWB).

The signal transmitting apparatus according to a first embodiment of the present invention stores by categorizing slot pairs that are connected by the same length of wiring pattern into groups. When a slot pair is specified for signal transmission, the signal transmitting apparatus transmits the signal while changing the correction value in the wiring pattern of the specified slot pair, obtains an error rate for every correction value, and sets an optimum correction value for the signals exchanged between the slot pair. The signal transmitting apparatus further sets the same correction value for the signals exchanged between other slot pairs in the same group.

An overview of the signal transmitting apparatus according to the first embodiment is described below. The signal transmitting apparatus according to the first embodiment includes the BWB that has eight slots connected by the wiring patterns and eight printed boards each of which has mounted thereon circuits for transmitting and receiving signals.

Figure 1:
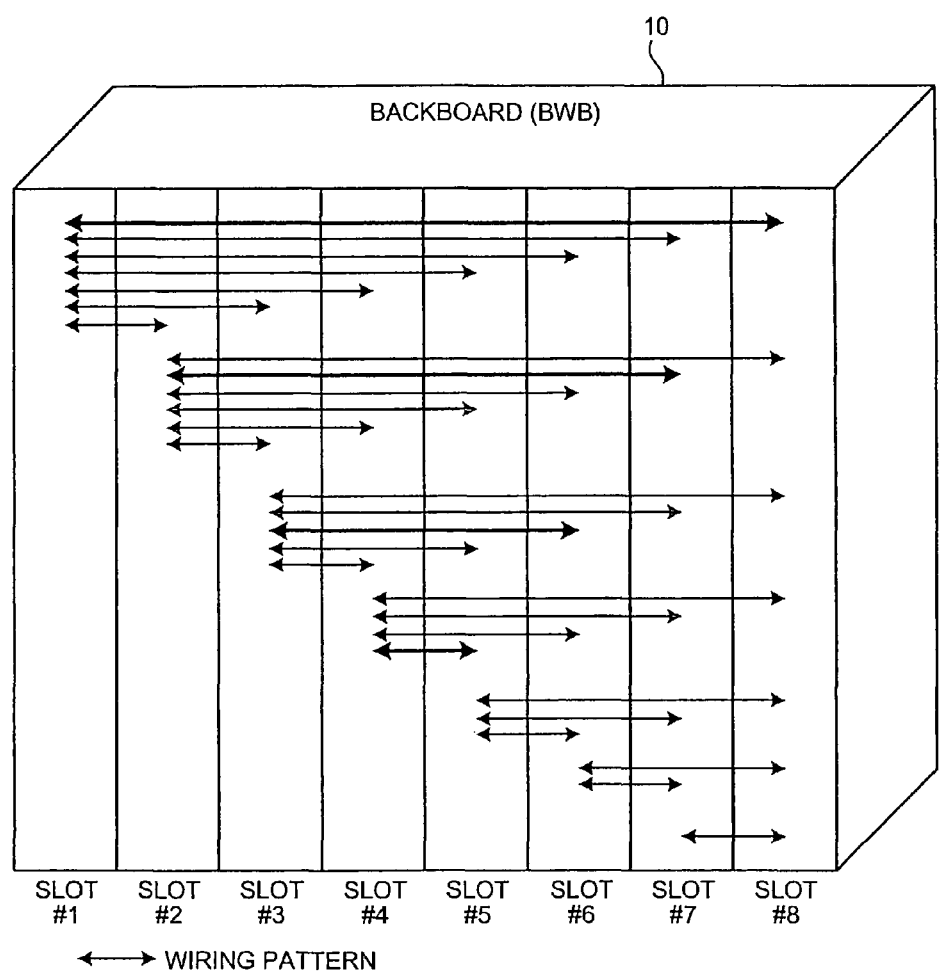
FIG. 1 is a schematic drawing of a BWB of a signal transmitting apparatus according to a first embodiment of the present invention.

FIG. 1 is a schematic drawing of the BWB of the signal transmitting apparatus according to the first embodiment. As shown in FIG. 1, a BWB 10 of the signal transmitting apparatus according to the first embodiment has eight slots, namely, slots #1 to #8. Each of the slots #1 to #8 is connected to every other slot one-to-one via wiring patterns.

Figure 2:
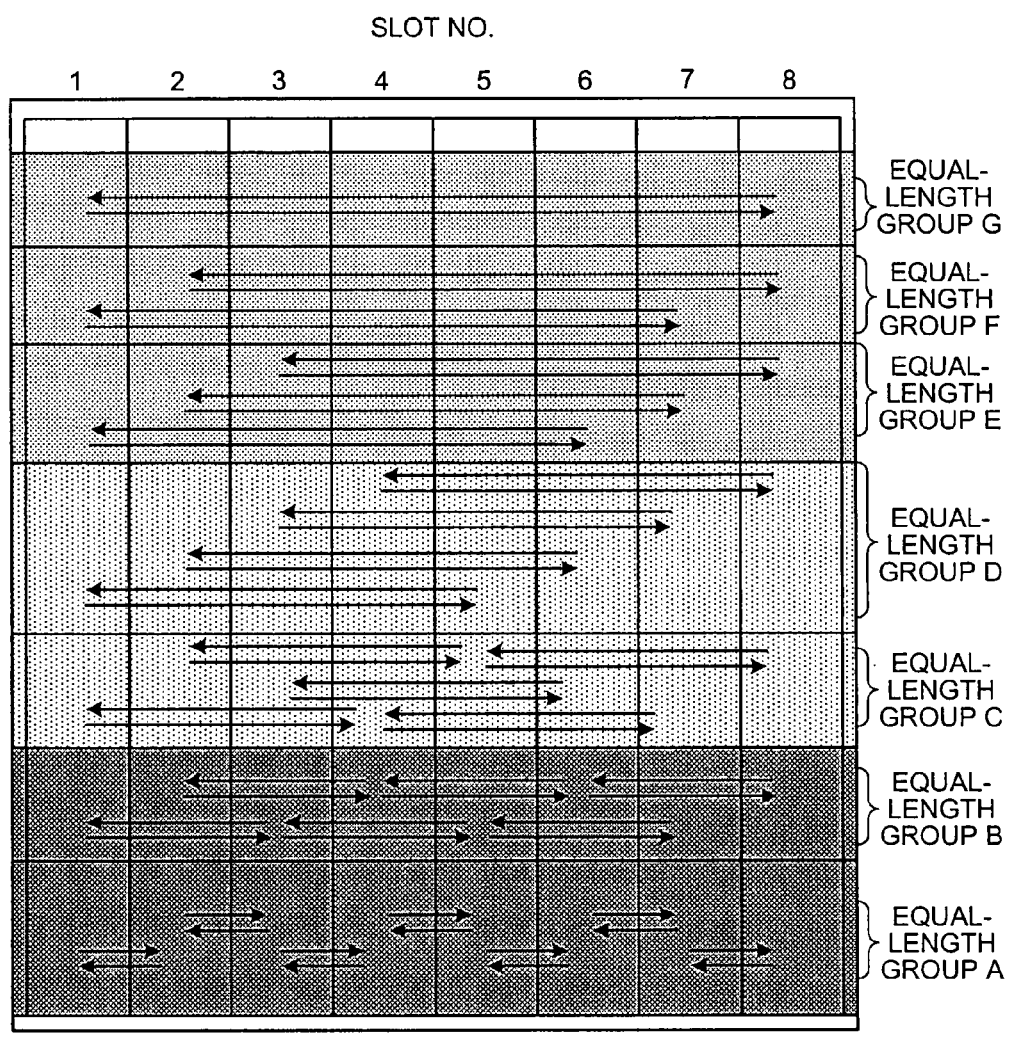
FIG. 2 is a drawing of an equal-length group categorization.

In the BWB 10, the slots pairs are categorized into seven groups (hereinafter, "equal-length group") according to the length of the wiring pattern connecting the slot pairs. FIG. 2 is a drawing of the equal-length group categorization. As shown in FIG. 2, the slot pairs are categorized into the equal-length groups A to G. In FIG. 2, the wiring patterns shown in FIG. 1 are shown as two separate wiring patterns, one for each direction.

Figure 3:
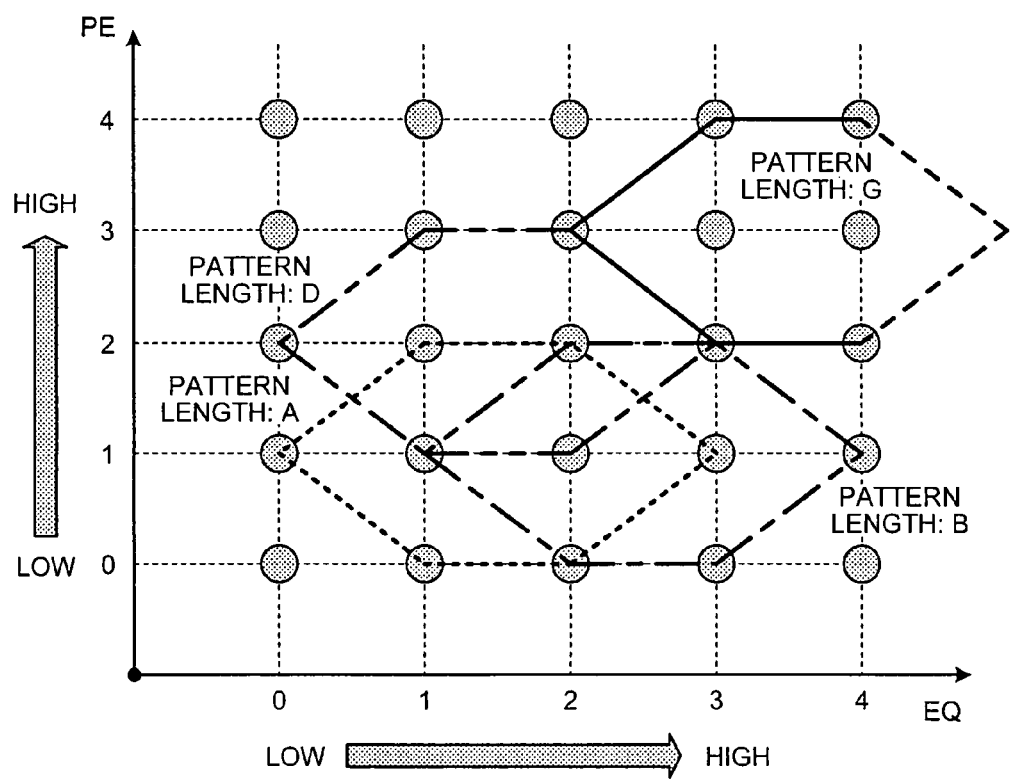
FIG. 3 is a drawing of an example of a relation between wiring pattern lengths, PE and EQ setting values, and an error rate.

A relation between the equal-length groups and pre-emphasis (PE) and equalizer (EQ) of transmission signals is explained below. FIG. 3 is a drawing of an example of the relation between the wiring pattern lengths, the PE and EQ setting values, and an error rate. The results of the error rate determined by transmitting signals between the slot pairs of the equal-length groups A, B, D, and G shown in FIG. 2 while changing the PE and EQ setting values are shown in FIG. 3. The area within each hexagonal shape indicates a range of setting values at which the transmission signal shows an error-free status (that is, when the signals are transmitted with negligible error rate).

Thus, when the slot pairs of the BWB 10 are categorized into equal-length groups divided every wiring pattern length, the optimum PE and EQ setting values differ from each other every equal-length group. In other words, the PE and EQ setting values can be set the same for all the slot pairs belonging to one equal-length group.

Thus, during initial settings, when a slot pair for transmitting signals is specified by the maintenance person, the signal transmitting apparatus according to the first embodiment transmits the signals between the slots of the specified slot pair while automatically changing the PE and EQ setting values, determines the optimum PE and EQ setting values (values at which the transmission signals show an error-free status), and sets the determined optimum setting values for all the slot pairs belonging to the same equal-length group to which the specified slot pair belongs.

After startup, the signal transmitting apparatus according to the first embodiment constantly monitors the error rate of the signals transmitted between the slots. If the error rate exceeds a predetermined threshold value, the signal transmitting apparatus transmits the signals between an unused (free) slot pair belonging to the same equal-length group as the one before while automatically changing the PE and EQ setting values, determines the optimum PE and EQ setting values for the slot pair, and sets the determined optimum setting values for all the slot pairs belong to the same equal-length group as the current slot pair.

Figure 4:
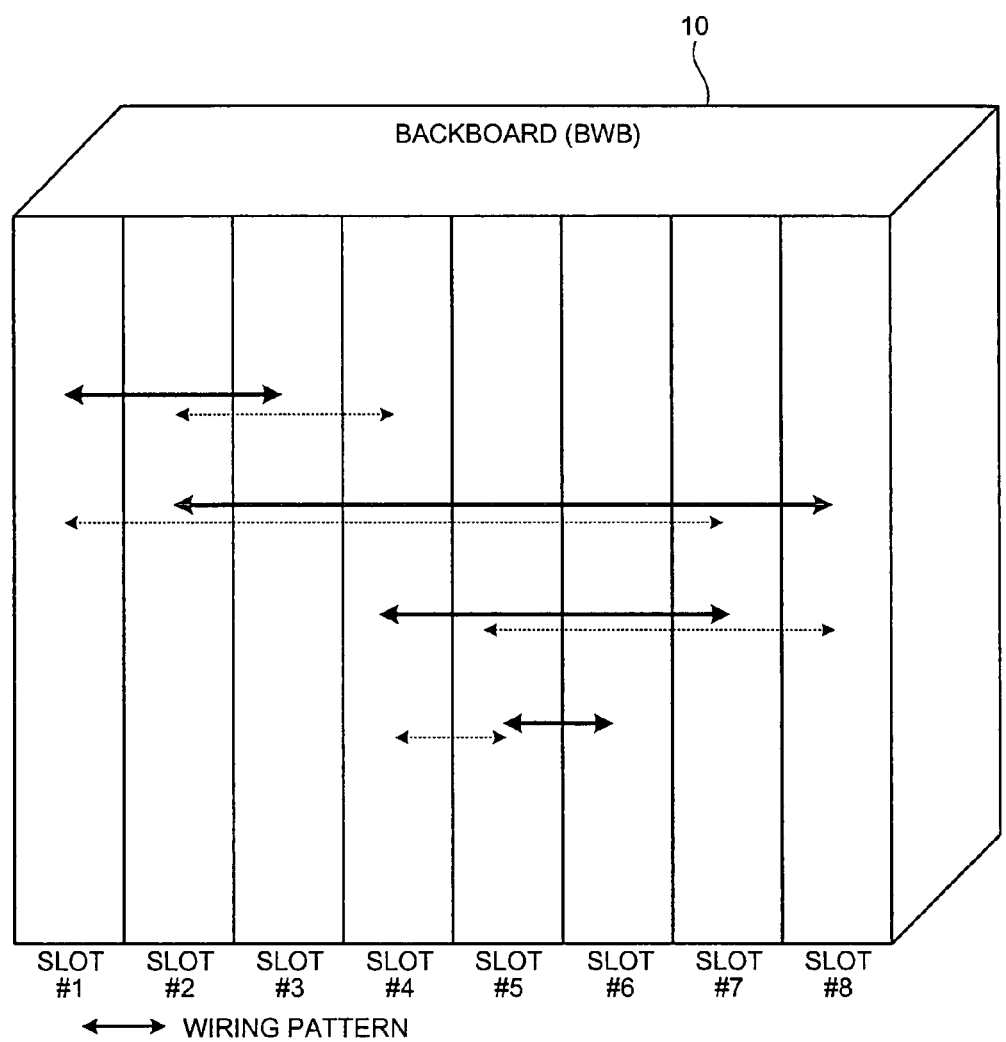
FIG. 4 is a schematic drawing for explaining optimum value setting detection after startup.

FIG. 4 is a schematic drawing for explaining optimum value setting detection after startup. For example, if the error rate of the transmission signals transmitted between the slots #1 and #3 after startup exceeds a predetermined threshold value, the signal transmitting apparatus starts transmitting the signals between the slots #2 and #4, which belongs to the same equal-length group as the slots #1 and #3 (as the wiring pattern lengths are the same in both slot pairs) while changing the PE and EQ setting values, determines the optimum setting values, and sets the determined optimum setting values for the slots #1 and #3. Similarly, if the error rate of the transmission signals transmitted between the slots #2 and #8 exceeds a predetermined threshold value, the signal transmitting apparatus determines the optimum setting values between the slots #1 and #7. Likewise, if the error rate of the transmission signals transmitted between the slots #4 and #7 exceeds a predetermined threshold value, the signal transmitting apparatus determines the optimum setting values between the slots #5 and #8.

Thus, the signal transmitting apparatus according to the first embodiment can correct the quality of the transmission signals both during initial settings and after startup without stopping the operation.

Figure 5:
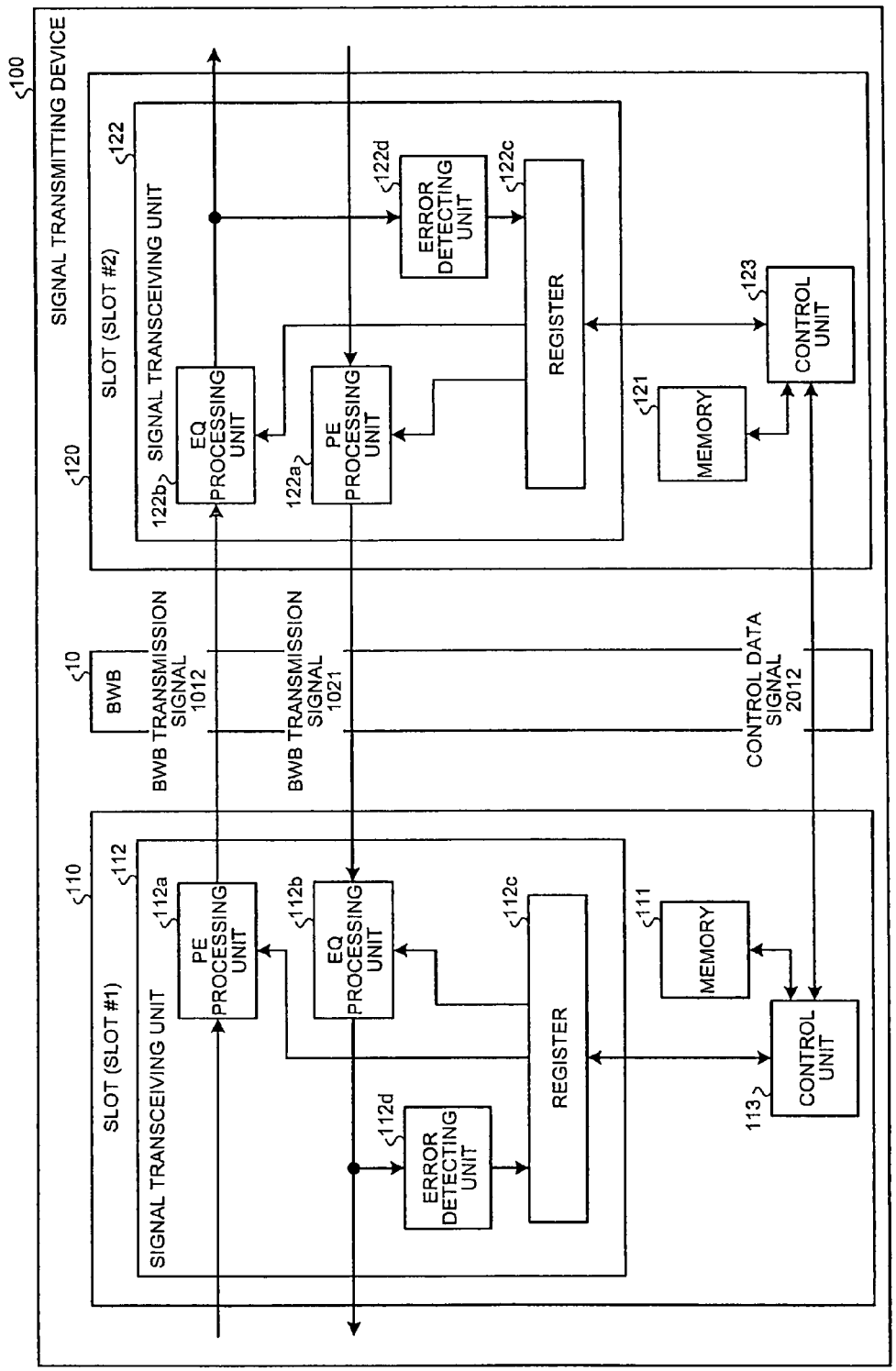
FIG. 5 is a block diagram of a configuration of the signal transmitting apparatus according to the first embodiment.
Figure 6:
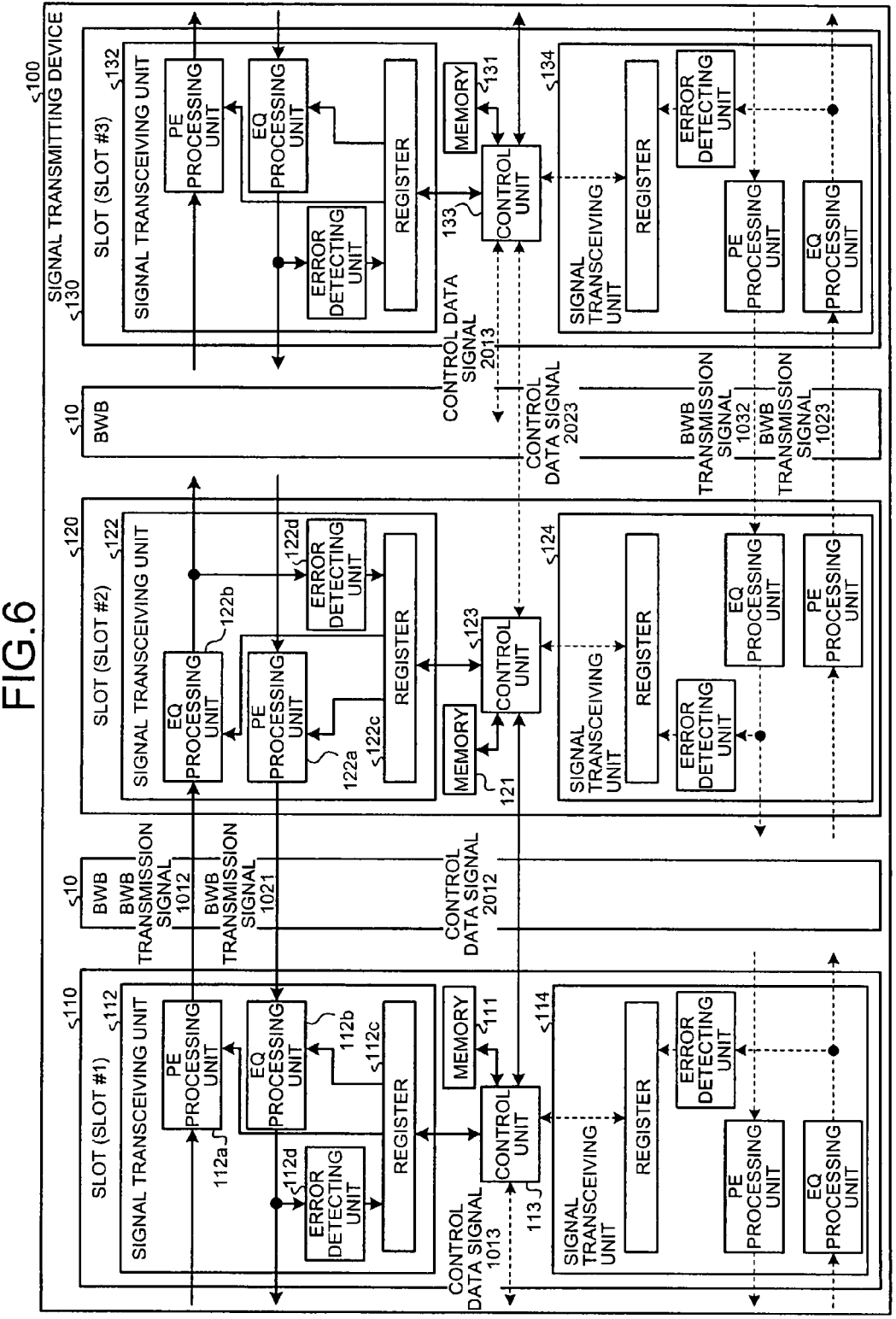
FIG. 6 is a block diagram of another configuration of the signal transmitting apparatus according to the first embodiment.

A configuration of the signal transmitting apparatus according to the first embodiment is described below. FIGS. 5 and 6 are block diagrams of the configuration of the signal transmitting apparatus according to the first embodiment. In FIGS. 5 and 6, a signal transmitting apparatus 100 includes a plurality of printed boards each of which performs a predetermined process, and the BWB 10 that has slots connecting the printed boards. For the sake of simplification, instead of the printed board itself, only the functional parts of the printed board are shown in FIGS. 5 and 6. The signals transmitted between the slots of the BWB 10 shall hereinafter be called "BWB transmission signals".

In FIG. 5, only two slots, namely, slots 110 (slot #1) and 120 (slot #2), are shown out of the eight slots of the BWB 10. The slots 110 and 120 are interfaces for insertion of the printed boards. A printed board that includes a memory 111, a signal transceiving unit 112 and a control unit 113 is connected to the slot 110, while a printed board that includes a memory 121, a signal transceiving unit 122 and a control unit 123 is connected to the slot 120.

The BWB transmission signal is exchanged mutually between the slots 110 and 120 in both directions. Only the directions of the BWB transmission signal exchanged between the slots 110 and 120 to which the two printed boards are connected are opposite to each other. Otherwise, the two printed boards have an identical structure as far as the functional parts pertaining to the present invention (the printed board (connected to the slot 120) includes the signal transceiving unit 122, a PE processing unit 122a, an EQ processing unit 122b, a register 122c, an error detecting unit 122d, the memory 121, and the control unit 123). Hence, only the functional parts of the printed board connected to the slot 110 are described below, as the same description is applicable to the corresponding functional parts of the printed board connected to the slot 120.

The memory 111 stores therein various kinds of data. In connection with the present invention, the memory 111 in advance has stored therein data in the form of the slot pairs and the equal-length groups in an associated form (hereinafter, "equal-length group data"). The equal-length group data, shown in Table 1 below, is data obtained by associating each slot pair representing a slot number pair and connected each other by a wiring pattern with the equal-length group to which the slot pair belongs.

TABLE 1

| | | Slot No. | | | | | | |
|---|---|---|---|---|---|---|---|---|
| | | 1 | 2 | 3 | 4 | 5 | 6 | 7 | 8 |
| Slot No. | 1 | | A | B | C | D | E | F | G |
| | 2 | A | | A | B | C | D | E | F |
| | 3 | B | A | | A | B | C | D | E |
| | 4 | C | B | A | | A | B | C | D |
| | 5 | D | C | B | A | | A | B | C |
| | 6 | E | D | C | B | A | | A | B |
| | 7 | F | E | D | C | B | A | | A |
| | 8 | G | F | E | D | C | B | A | |

When the optimum PE and EQ setting values to the BWB transmission signals being transmitted between a slot pair are set, the equal-length group data, which is actually data pertaining to the slot pairs categorized into groups according to the length of the wiring pattern connecting the slot pairs, stored in the memory 111 is referred to, and the same optimum PE and EQ setting values are set for the BWB transmission signals transmitted between other slot pairs belonging to the same group as the slot pair for which the optimum setting values has been set.

The signal transceiving unit 112 controls the transmission and reception of the BWB transmission signals when the BWB transmission signals are transmitted between the slots 110 and 120. In connection with the present invention, the signal transceiving unit 112 includes the following functional parts, namely, a PE processing unit 112a, an EQ processing unit 112b, a register 112c, and an error detecting unit 112d.

The PE processing unit 112a transmits a BWB transmission signal 1012 to the slot 120. When transmitting the BWB transmission signal 1012, the PE processing unit 112a subjects the BWB transmission signal 1012 to PE signal correction based on a predetermined setting value. Predetermined setting value refers to a level and five value levels from 0 to 4 can be set. The five value levels are defined by voltage levels.

The EQ processing unit 112b receives a BWB transmission signal 1021 from the slot 120. Upon receiving the BWB transmission signal 1021, the EQ processing unit 112b subjects the BWB transmission signal 1021 to EQ signal correction based on a predetermined setting value.

Predetermined setting value refers to a level and five value levels from 0 to 4 can be set. The five value levels are defined by voltage levels.

The register 112c is a storage unit used for calculations for various processes performed by the control unit 113, which is described later, and for maintaining the execution status. The register 112c for example temporarily holds the PE and EQ setting values set by the PE processing unit 112a and the EQ processing unit 112b, respectively.

The error detecting unit 112d detects the error rate of the BWB transmission signal 1021 corrected by the EQ processing unit 112b as needed, and notifies the control unit 113.

The control unit 113 controls the operation of the various functional units of the printed board connected to the slot 110 by executing various processes. In particular relevance to the present invention, the control unit 113 performs, for every equal-length group, an optimum setting value searching process to determine the optimum PE and EQ setting values during initial settings as well as after startup, and sets the determined optimum setting values in the PE processing unit and the EQ processing unit of the printed board connected to each slot. The optimum setting value searching process and an optimum setting value setting process, which includes the optimum setting value searching process, are described in detail later.

The control unit 113 is communicably connected to the control units of the printed boards connected to other slots via control data signals. For example, the control unit 113 is connected to the control unit 123 of the printed board connected to the slot 120 via a control data signal 2012.

Though not shown in FIG. 5, apart from the slots 110 and 120, the signal transmitting apparatus 100 has six other slots (slots #3 to #8) to each of which the slots 110 and 120 are mutually connected.

Though not shown in FIG. 5, apart from the signal transceiving unit 112, the printed board connected to the slot 110 has six other signal transceiving units corresponding to the six other signal transceiving units for mutual transmission and reception of the BWB transmission signals (the same is the case for the printed board connected to the slot 120).

For example, as shown in FIG. 6, the signal transmitting apparatus 100 has a slot 130 (slot #3) other than the slots 110 and 120, and the printed board connected to the slot 110 has a signal transceiving unit 114 apart from the signal transceiving unit 112. Similarly, the printed board connected to the slot 120 has a signal transceiving unit 124 apart from the signal transceiving unit 122.

The signal transceiving unit 114 controls the transmission and reception of the BWB transmission signals transmitted between a not shown slot and the slot 110. The signal transceiving unit 124 controls the transmission and reception of the BWB transmission signals transmitted between the slots 120 and 130. Both the signal transceiving units 114 and 124 have the same functional parts as the signal transceiving unit 112.

A printed board that includes a memory 131, signal transceiving units 132 and 134 and a control unit 133 is connected to the slot 130. The memory 131, the signal transceiving units 132 and 134, and the control unit 133 are functionally identical to the memory 111, the signal transceiving units 112 and 114, and the control unit 113, respectively.

The optimum setting value searching process performed by the control unit is described below. The optimum setting value searching process is performed by transmitting signals between a predetermined slot pair while changing the PE and EQ setting values, and detecting the PE and EQ setting values set for the slot pair. Predetermined slot pair refers to a pair slot specified by the maintenance person during initial setting and to a pair slot that has BWB transmission signals transmitted between them with the error rate exceeding a predetermined threshold value after startup.

As an example, the optimum PE and EQ setting values are determined for the BWB transmission signal 1012 transmitted from the slot 110 to the slot 120 shown in FIG. 5. The optimum setting value searching process is performed by the control unit 123 of the printed board on the receiving side, which is the printed board connected to the slot 120.

The setting values of the PE processing unit 112a of the printed board connected to the slot 110 and the EQ processing unit 122b of the printed board connected to the slot 120 are supposed as zero. The control unit 123 first retrieves the error rate of the BWB transmission signal 1012 notified by the error detecting unit 122d via the register 122c at these setting values. It is assumed that the error rate retrieved by the control unit 123 is "1.0E-9".

The control unit 123 stores the error rate "1.0E-9" of the BWB transmission signal, the setting value "0" of the PE processing unit 112a, and the setting value "0" of the EQ processing unit 122b in an associated form in the memory 121. The control unit 123 then sends a request, via the control data signal 2012, to the control unit 113 of the printed board connected to the slot 110 to change the setting value of the PE to "1".

Upon receiving the request, the control unit 113 changes the setting value of the PE processing unit 112a to "1" via the register 112c, and notifies the control unit 123 of the change via the control data signal 2012.

Upon being notified by the control unit 113, the control unit 123 retrieves the error rate of the BWB transmission signal 1012 notified by the error detecting unit 122d at that instant. In other words, the control unit 123 retrieves, via the register 122c, the error rate of the BWB transmission signal 1012 when the setting value of the PE processing unit 112a is "1" and the that of the EQ processing unit 122b is "0". It is assumed that the error retrieved at these setting values is "11.0E-10".

The control unit 123 then stores the error rate "1.0E-10" of the BWB transmission signal, the setting value "1" of the PE processing unit 112a, and the setting value "0" of the EQ processing unit 122b in an associated form in the memory 121.

The control unit 123 subsequently changes the setting value of the PE processing unit 112a to "2", "3", and "4" successively, retrieves the error rate of the BWB transmission signal 1012 for each setting value, and stores the values and the error rate in an associated form in the memory 121 for each case. At this point, the setting value of the PE processing unit 112a is "4" and that of the EQ processing unit 122b is "0".

The control unit 123 next changes the setting value of the EQ processing unit 122b to "1" via the register 122c.

The control unit 123 retrieves, via the register 122c, the error rate of the BWB transmission signal 1012 notified by the error detecting unit 122d at these setting values. In other words, the control unit 123 retrieves the error rate of the BWB transmission signal 1012 when the setting value of the PE processing unit 112a is "4" and that of the EQ processing unit 122b is "1". It is assumed that the error rate retrieved by the control unit 123 is "1.0E-10".

After storing the error rate of the BWB transmission signal "1.0E-10", the setting value "4" of the PE processing unit 112a, and the setting value "1" of the EQ processing unit 122b in an associated form in the memory 121, the control unit 123 changes the setting value of the EQ processing unit 122b to "2" via the register 122c.

The control unit 123 retrieves, via the register 122c, the error rate of the BWB transmission signal 1012 notified by the error detecting unit 122d at these setting values. In other words, the control unit 123 retrieves the error rate of the BWB transmission signal 1012 when the setting value of the PE processing unit 112a is "4" and that of the EQ processing unit 122b is "2". It is assumed that the error rate retrieved by the control unit 123 is "1.0E-11".

The control unit 123 then stores the error rate "1.0E-11" of the BWB transmission signal, the setting value "4" of the PE processing unit 112a, and the setting value "2" of the EQ processing unit 122b in an associated form in the memory 121.

The control unit 123 subsequently changes the setting value of the EQ processing unit 122b to "3" and "4" successively, retrieves the error rate of the BWB transmission signal 1012 for each setting value, and stores the values and the error rate in an associated form in the memory 121 for each case.

The control unit 123 then repeats the process described above for all possible combinations of the setting values "1", "2", "3", and "4" of the PE processing unit 112a and the EQ processing unit 122b, and stores the retrieved result in the memory 121. As a result, a determination result (hereinafter, "error rate determination result") shown below in Table 2 is stored in the memory 121.

Figure 8:
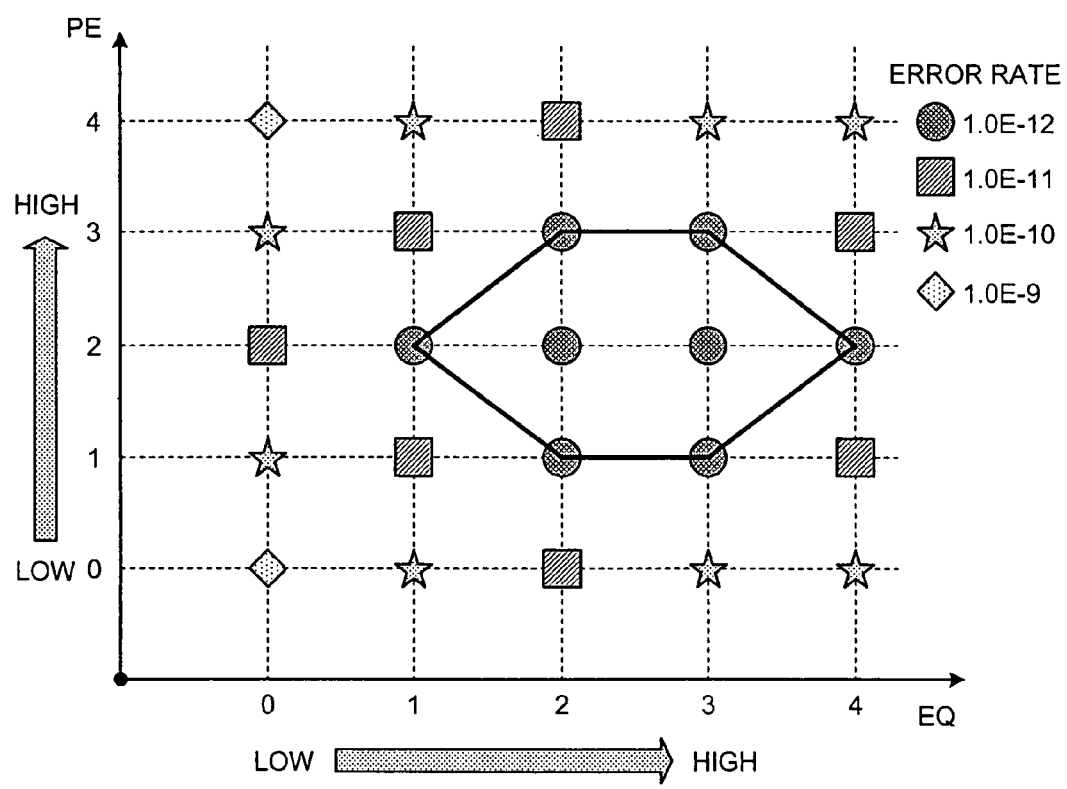
FIG. 8 is a schematic drawing of an example of an error rate determination result.

After determining the error rate for all the PE and EQ setting values, the control unit 123 determines the optimum PE and EQ setting values based on the error rate determination result. FIG. 8 is a schematic drawing of an example of an error rate determination result. It is assumed that "1.0E-12" represented the error rate that corresponds to an error-free status of the transmission signals, in FIG. 8, the PE and EQ setting values within the hexagonal shape can be said to be the error rates at which the transmission signals are transmitted virtually devoid of error, and becomes therefore candidates of the optimum setting values.

The PE and EQ setting values are associated with the voltage, and as the PE and EQ setting values increase from "0" to "4", the power consumption of the PE processing unit 112a and the EQ processing unit 122b increases. Hence, the optimum setting values should preferably be a small value.

The optimum setting values should also preferably be able to withstand degradation due to the most external factors. Therefore, the optimum setting values on the border of error-free status and error status should preferably be avoided, taking into account the fact that error rate determination may be error-ridden.

Among the PE and EQ setting values within the error-free status range (not including the PE and EQ setting values on the border), the control unit 123 selects the setting values whose sum is the least. For example, in the example shown in FIG. 8, the control unit 123 will select the PE setting value "2" and the EQ setting value "2". If there are setting values within the error-free status border, the control unit 123 will select from among the setting values on the border the setting values whose sum is the least.

The control unit 123 performs the optimum setting value detection for all the equal-length groups, and stores the optimum setting values associated with the corresponding equal-length group (hereinafter, "optimum setting value data") in the memory 121, as shown below in Table 3.

TABLE 2

|  | EQ: 24 = 0 | EQ: 24 = 1 | EQ: 24 = 2 | EQ: 24 = 3 | EQ: 24 = 4 |
| --- | --- | --- | --- | --- | --- |
| PE: 13 = 0 | 1.0E−9 | 1.0E−10 | 1.0E−11 | 1.0E−10 | 1.0E−10 |
| PE: 13 = 1 | 1.0E−10 | 1.0E−11 | 1.0E−12 | 1.0E−12 | 1.0E−11 |
| PE: 13 = 2 | 1.0E−11 | 1.0E−12 | 1.0E−12 | 1.0E−12 | 1.0E−12 |
| PE: 13 = 3 | 1.0E−10 | 1.0E−11 | 1.0E−12 | 1.0E−12 | 1.0E−11 |
| PE: 13 = 4 | 1.0E−9 | 1.0E−10 | 1.0E−11 | 1.0E−10 | 1.0E−10 |

Figure 7:
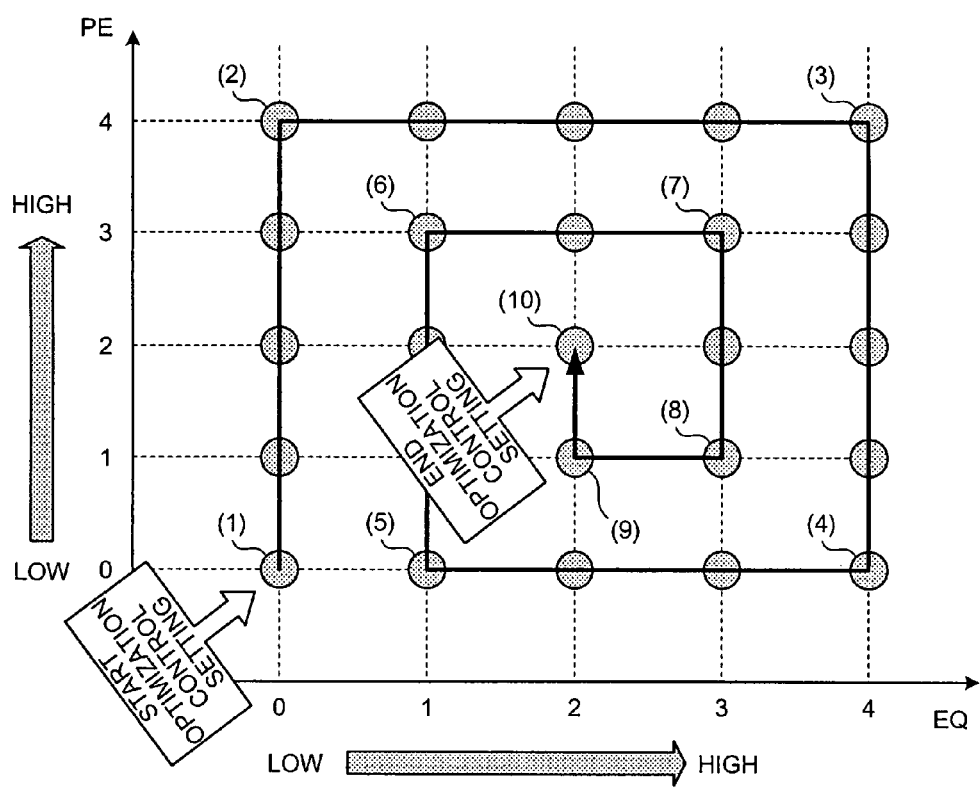
FIG. 7 is a schematic drawing for explaining an example of a sequence of error rate determination.

The error rate determination carried out by the control unit 123 need not be performed in any one particular sequence. FIG. 7 is a schematic drawing for explaining an example of an error rate determination sequence. As shown in FIG. 7, the PE setting value can be increased stepwise as represented by (1) to (2) followed by the EQ setting value as represented by (2) to (3). Next, the PE setting value can be decreased stepwise as represented by (3) to (4) followed by the EQ setting value as represented by (4) to (5). Next, the PE setting value can be increased stepwise as represented by (5) to (6) followed by the EQ setting value as represented by (6) to (7). Next, the PE setting value can be decreased stepwise as shown in (7) to (8) followed by the EQ setting value as represented by (8) to (9). In the end, the PE setting value can be increased by one level as represented by (9) to (10).

TABLE 3

| Group | PE | EQ |
| --- | --- | --- |
| A | 1 | 1 |
| B | 1 | 2 |
| C | 1 | 3 |
| D | 2 | 1 |
| E | 2 | 2 |
| F | 2 | 3 |
| G | 3 | 3 |

The optimum setting value setting process according to the first embodiment is explained below. The optimum setting value setting process both during initial settings and after startup are described.

Figure 9:
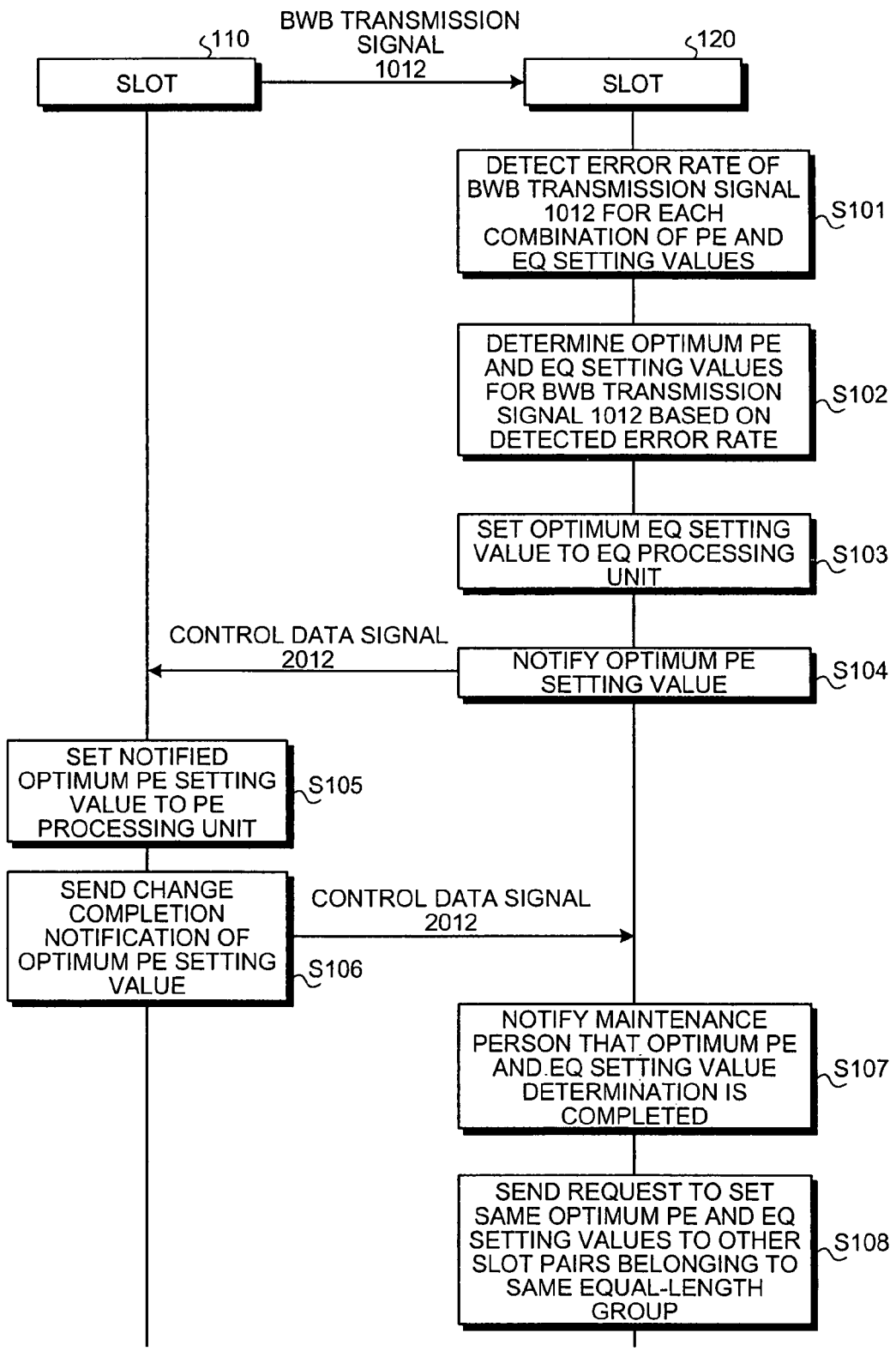
FIG. 9 is a sequence diagram of an optimum setting value setting process performed during initial settings by the signal transmitting apparatus according to the first embodiment.

FIG. 9 is a sequence diagram of an optimum setting value setting process performed during initial settings by the signal transmitting apparatus 100 according to the first embodiment. As an example, the optimum PE and EQ setting values are determined for the BWB transmission signal 1012 transmitted from the slot 110 to the slot 120 shown in FIG. 5.

The optimum setting value searching process is first performed for the BWB transmission signal 1012. In other words, the control unit 123 of the printed board connected to the slot 120, which is the receiving side that receives the BWB transmission signal 1012 detects the error rate for all the PE and EQ combinations (step S101) and determines the optimum PE and EQ setting values based on the detected error rate (step S102).

The control unit 123 then sets the optimum EQ setting value to the EQ processing unit 122b (step S103), and notifies the optimum PE setting value to the slot 110 via the control data signal 2012 (step S104).

Upon receiving the request to set the optimum PE setting value, the control unit 113 of the slot 110 sets the optimum PE setting value to the PE processing unit 112a (step S105), and notifies the slot 120 via the control data signal 2012 of the change completion (step S106).

Upon receiving the change completion notification, the control unit 123 of the slot 120 notifies the maintenance person that the optimum PE and EQ setting value setting process is completed (step S107).

The control unit 123 then refers to the equal-length group data stored in the memory 121 and looks for other slot pairs belonging to the same equal-length group A to which the slot pair formed by the slots 110 and 120 (slots #1 and #2) belongs. The control unit 123 then sends a request to the control units of the relevant slots via the respective control data signals, requesting the control units to set the same optimum PE and EQ setting values (step S108).

Figure 10:
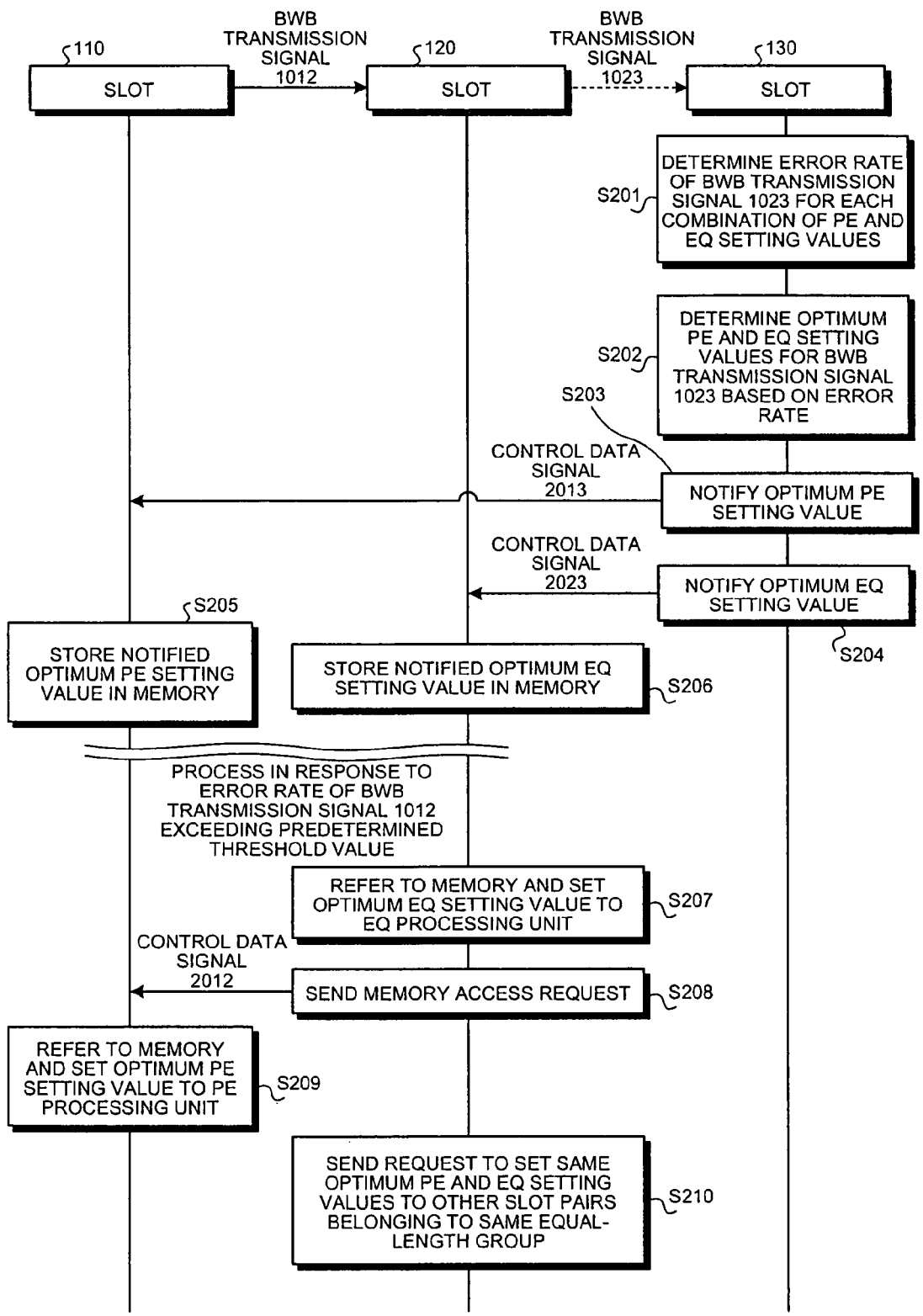
FIG. 10 is a sequence diagram of the optimum setting value setting process performed after startup by the signal transmitting apparatus according to the first embodiment.

The optimum setting value setting process after startup is described below. FIG. 10 is a sequence diagram of the optimum setting value setting process performed after startup by the signal transmitting apparatus 100 according to the first embodiment. In this example, it is assumed that, after start up, with reference to the signal transmitting apparatus 100 shown in FIG. 6, the BWB transmission signals 1012 and 1021 transmitted between the slots 110 and 120 are used and the BWB transmission signals 1023 and 1032 transmitted between the slots 120 and 130 are not used.

After the signal transmitting apparatus 100 is started up, a control unit 133 of the slot 130 that receives the BWB transmission signal 1012 performs the optimum PE and EQ setting value searching process using the BWB transmission signal 1023, which usually remains unused. In other words, the control unit 133 detects the error rate of the BWB transmission signal 1023 for all the combinations of the PE and EQ setting values (step S201), and determines the optimum PE and EQ setting values for the BWB transmission signal 1023 based on the detected error rate (step S202).

It is assumed that the error rate of the BWB transmission signal 1012 that is used is "1.0E-11", and the determined optimum setting value of the PE processing unit 112a is "2" and that of the EQ processing unit 122b is "3". The optimum setting values can be verified by referring to the equal-length group data, and the optimum setting value data stored in the memory of the printed board connected to every slot.

The control unit 133 notifies the determined optimum PE setting value ("2") to the slot 110 via a control data signal 2013 (step S203), and notifies the determined optimum EQ setting value ("3") to the slot 120 via a control data signal 2023 (step S204).

Based on the received optimum PE setting value, the control unit 113 stores in the memory 111 the value "2" as the optimum PE setting value of the BWB transmission signal under current environmental conditions (step S205).

Meanwhile, based on the received optimum QE setting value, the control unit 123 stores in the memory 121 the value "3" as the optimum QE setting value of the BWB transmission signal under current environmental conditions (step S206).

The control unit 123 then determines whether the error rate of the BWB transmission signal 1012 notified by the error detecting unit 122d exceeds a predetermined threshold value. It is assumed that the threshold value is "1.0E-10". As at this point the error rate of the BWB transmission signal 1012 is "1.0E-11" and has not exceeded the threshold value, the control unit 123 does not change the setting value of the EQ processing unit 112b.

The control unit 133 performs the optimum setting value searching process once again, and from time to time determines the optimum PE and EQ setting values for the BWB transmission signal 1023 under the current environmental conditions, and notifies the optimum PE and EQ setting values to the control unit 113 of the slot 110 and the control unit 123 of the slot 120, respectively, by repeating steps S201 to S204.

Every time the optimum PE setting value is received, the control unit 113 stores it in the memory 111. Similarly, every time the optimum EQ setting value is received, the control unit 123 overwrites the previous optimum EQ setting value in the memory 121 with the fresh optimum EQ setting value (same as steps S205 and S206).

Thus, as long as the error rate of the BWB transmission signal 1012 does not exceed the predetermined threshold value, the steps S201 to S206 are repeated, and the memory 111 and the memory 121 always have stored in them the optimum PE and EQ setting values for the BWB transmission signal 1012 under the current environmental conditions.

If the error rate of the BWB transmission signal 1012 exceeds the threshold value, the control unit 123 retrieves the optimum EQ setting value under the current environmental conditions from the memory 121, sets the retrieved optimum EQ setting value to the EQ processing unit 122b (step S207), and sends a memory access request to the control unit 113 via the control data signal 2012 (step S208).

Upon receiving the memory access request, the control unit 113 refers to the memory 111, retrieves the optimum PE setting value under the current environmental conditions, and sets the retrieved optimum PE setting value to the PE processing unit 112a (step S209).

The control unit 123 then refers to the equal-length group data stored in the memory 121 and looks for other slot pairs belonging to the same equal-length group A to which the slot pair formed by the slots 110 and 120 (slots #1 and #2) belongs. The control unit 123 then sends a request to the control units of the relevant slots via the respective control data signals, requesting the control units to set the same optimum PE and EQ setting values (step S210).

Thus, when the error rate of a transmission signal exceeds a predetermined threshold value, not only is the degradation of the transmission signal in question corrected, but the optimum PE and EQ setting values of all the transmission signals belonging to the same group as the corrected transmission signal can be changed to the new setting values.

Thus, in the first embodiment, slot pairs are stored categorized into equal-length groups based on the length of the wiring pattern connecting each slot pair. When a slot pair is specified, the error rate is detected for the transmission signal being transmitted between the slot pair while changing the PE and EQ setting values of the transmission signal and the optimum PE and EQ setting values are determined. All the slot pairs belonging to the same equal-length group as the specified slot pair are selected and the determined optimum PE and EQ setting values are set to all the selected slot pairs based on the detected error rate. Consequently, the optimum PE and EQ setting values of all the slot pairs belonging to one equal-length group is changed at the same time, enabling determining and setting appropriate correction magnitudes in a short time.

Further, in the first embodiment, it is confirmed whether the specified slot pair is in use, and if the slot pair is in use, the error pattern of a free slot pair belonging to the same equal-length group as the specified slot pair is determined while changing the PE and EQ setting values of the signal. Consequently, appropriate correction magnitudes can be set even after startup without affecting the operations.

Further, in the first embodiment, the error rate of the signal transmitted via the wiring pattern between a slot pair is determined while changing the PE and EQ setting values of the signal, and the optimum PE and EQ setting values are set based on the determined error rate.

Consequently, appropriate correction magnitudes can be determined and set even if the system is configured to perform correction of the signal transmitted via the wiring pattern connecting the slot pair during both transmission and reception.

Further, in the first embodiment, the PE and EQ setting values corresponding to the error rate less than or equal to predetermined threshold value are retrieved, and from among the retrieved PE and EQ setting values, the PE and EQ setting values whose sum is the least is set as the PE and EQ setting values for the selected slot pair. Consequently, power consumption can be kept down, as larger correction magnitudes translate to higher power consumption.

In the first embodiment, after startup, if the error rate of the BWB transmission signal transmitted between a slot pair exceeds a predetermined threshold value, a free slot pair belonging to the same slot pair as the one with incorrect error rate is automatically used for determining the optimum PE and EQ setting values by transmitting the signal between them while changing the PE and EQ setting values.

Figure 11:
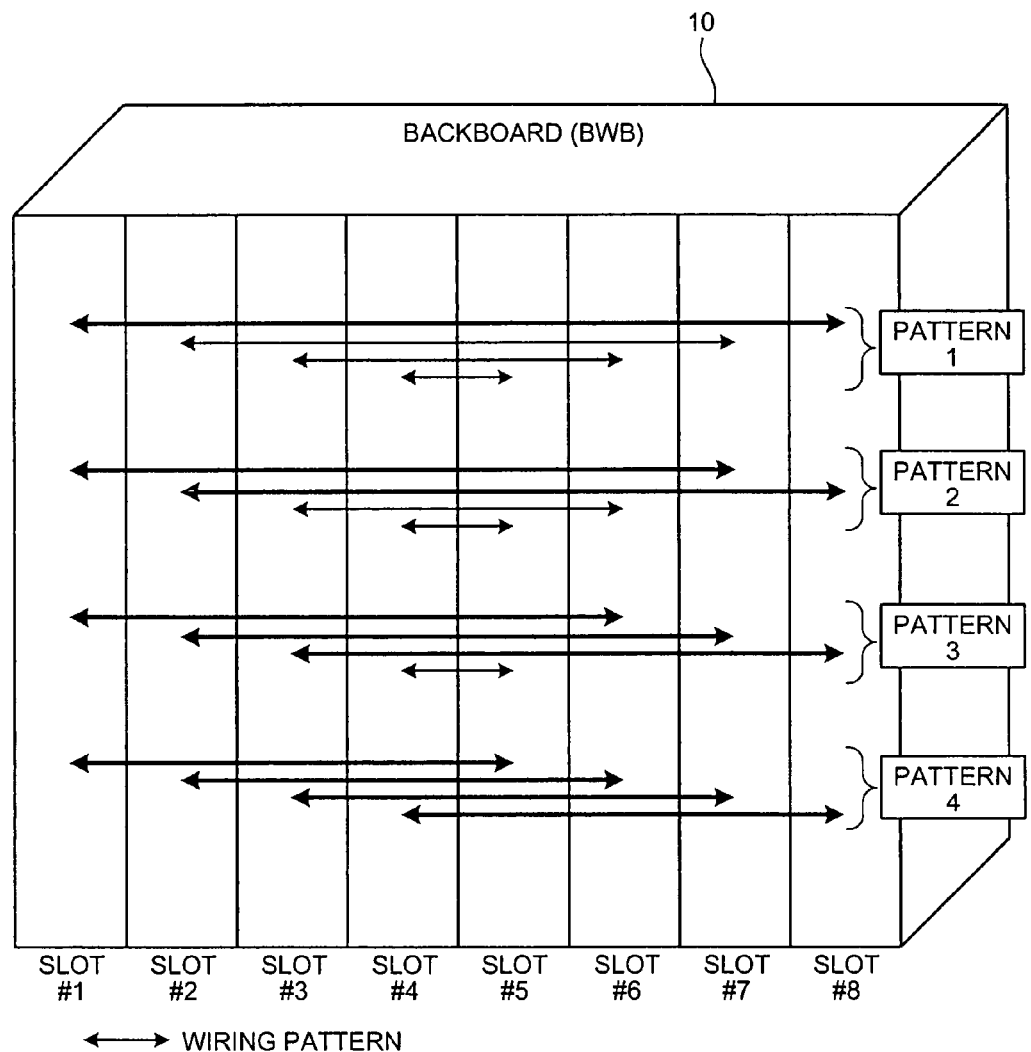
FIG. 11 is a schematic drawing of a BWB in which all slot pairs belonging to any equal-length group are in use.

However, there may arise a situation wherein all slot pairs are in use and no free slot pair is available. FIG. 11 is a schematic drawing of a BWB in which all the slot pairs belonging to any equal-length group are in use. In FIG. 11, patterns 1 to 4 represent the slot pair combinations being used after startup. In pattern 1, for example, the slot pair formed by the slots #1 and #8 belonging to the same equal-length group is not originally exist. In pattern 2, though the slot pair formed by the slots #2 and #8 belongs to the same equal-length group as the slot pair formed by the slots #1 and #7, it is also in use. Likewise, in pattern 3, all slot pairs that belong to the same equal-length group as the slot pair formed by the slots #1 and #6 are in use. Also, in pattern 4, all slot pairs that belong to the same equal-length group as the slot pair formed by the slots #1 and #5 are in use.

In a second embodiment of the present invention, an approximative optimum PE and EQ setting value determination method is explained wherein a free slot pair belonging to another equal-length group is used when no free slot pair belonging to the same equal-length group as the slot pair for which correction of BWB transmission signal is to be performed is available.

An overview of an optimum setting value determination method of a signal transmitting apparatus according to the second embodiment is described below. As an example, the optimum PE and EQ setting values are determined for the BWB transmission signal transmitted between the slots #1 and #8 of pattern 1 shown in FIG. 11.

Figure 12:
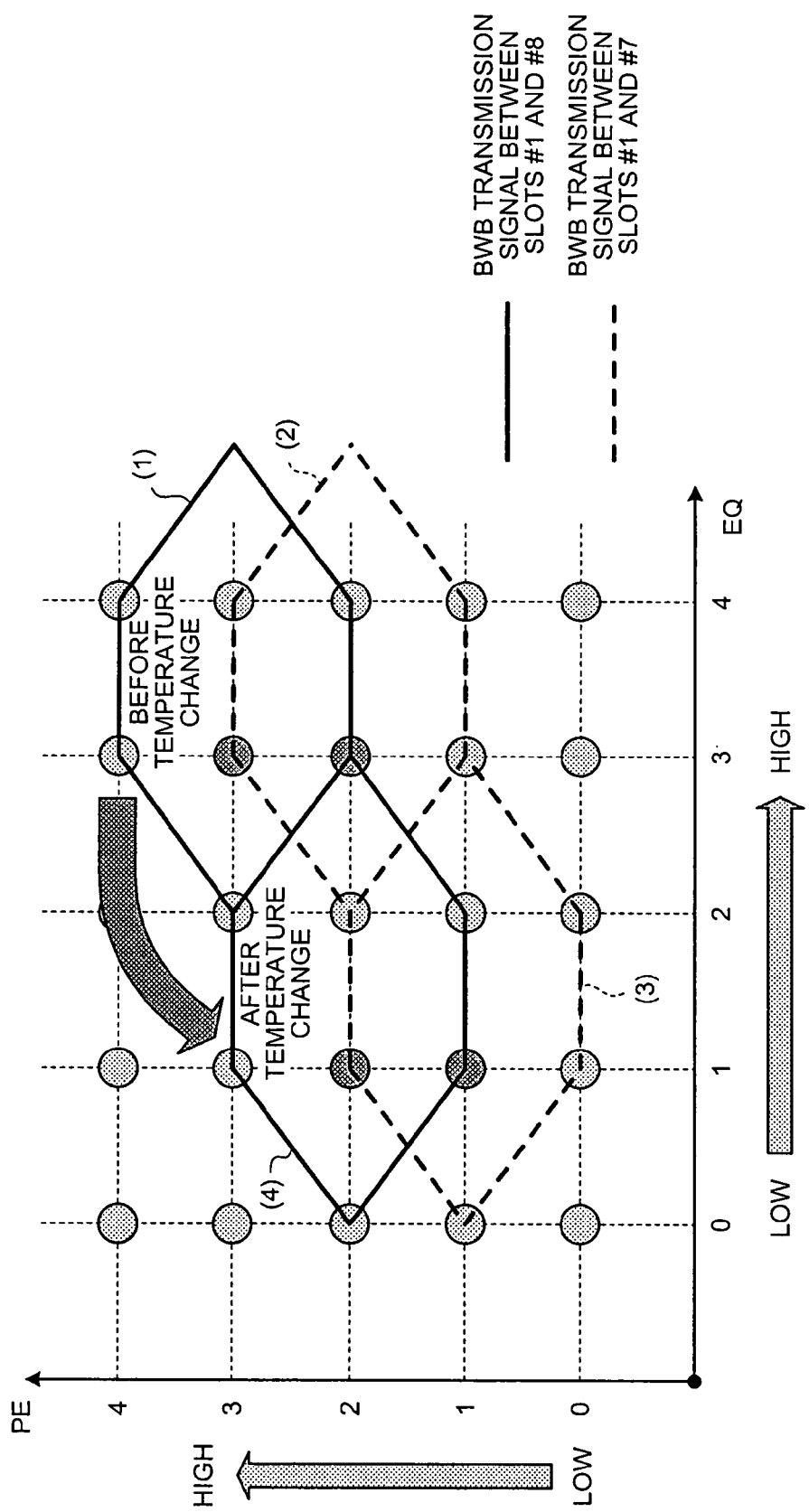
FIG. 12 is a schematic drawing for explaining an overview of a determination method of optimum setting values by a signal transmitting apparatus according to a second embodiment of the present invention.

FIG. 12 is a schematic drawing for explaining the overview of the determination method of the optimum setting values by the signal transmitting apparatus according to the second embodiment. The reference symbol (1) in FIG. 12 represents the PE and EQ setting value range, determined prior to system startup during initial settings, in which the BWB transmission signal transmitted between the slots #1 and #8 shows an error-free status. The reference symbol (2) represents the PE and EQ setting value range, determined prior to system startup during initial settings, in which the BWB transmission signal transmitted between the slots #1 and #7 shows an error-free status. It is assumed that the optimum PE and EQ setting values for the BWB transmission signal transmitted between the slots #1 and #8 are "3" and "3", respectively, and the optimum PE and EQ setting values for the BWB transmission signal transmitted between the slots #1 and #7 are "2" and "3", respectively.

During initial settings, the signal transmitting apparatus according to the second embodiment calculates and stores the difference between the optimum PE setting values for the BWB transmission signals transmitted between the slots #1 and #8 and the slots #1 and #7. Similarly, the signal transmitting apparatus calculates and stores the difference between the optimum EQ setting values for the BWB transmission signals transmitted between the slots #1 and #8 and the slots #1 and #7. In other words, the signal transmitting apparatus stores "1" and "0" as the difference of the optimum PE and EQ setting values between the two slot pairs.

It is assumed that there is degradation of the BWB transmission signal transmitted between the slots #1 and #8 after startup due to temperature variation. As no other slot pair exists that belongs to the same equal-length group as the slot pair formed by the slots #1 and #8, the signal transmitting apparatus transmits signal between a slot pair that belongs to an equal-length group that is next shorter than the equal-length group to which the slot pair formed by the slots #1 and #8 belongs, which in this case is the slot pair formed by the slots #1 and #7, and determines the optimum PE and EQ setting values.

It is assumed that the setting value range represented by the reference symbol (3) corresponds to the PE and EQ setting value range in which the BWB transmission signal transmitted between the slots #1 and #7 show an error-free status. The signal transmitting apparatus selects the optimum PE and EQ setting values as "1" and "1", respectively, taking into account the power consumption and the measured error.

The signal transmitting apparatus adds the difference calculated during initial settings to the optimum PE and EQ setting values for the BWB transmission signal transmitted between the slots #1 and #7, and approximatively calculates the optimum PE and EQ setting values for the BWB transmission signal transmitted between the slots #1 and #8. Specifically, the signal transmitting apparatus adds the difference in the optimum PE setting values for the BWB transmission signals transmitted between the slots #1 and #8 and the slots #1 and #7 "1" to the optimum PE setting value "1" for the BWB transmission signal transmitted between the slots #1 to #7. Similarly, the signal transmitting apparatus adds the difference in the optimum EQ setting values for the BWB transmission signals transmitted between the slots #1 and #8 and the slots #1 and #7 "0" to the optimum EQ setting value "1" for the BWB transmission signal transmitted between the slots #1 and #7, obtains "2" and "1" as the optimum PE and EQ setting values, respectively, for the transmission signal transmitted between the slots #1 and #8 (see (4) of FIG. 12).

Thus, in the signal transmitting apparatus according to the second embodiment, if there are no slot pairs that are connected by a free wiring pattern of equal length, the error rate is determined while changing the PE and EQ setting values of the signal transmitted between a slot pair connected by a free wiring pattern of a different length. The optimum PE and EQ setting values are derived based on the determined error rate and the difference data stored during initial settings. Consequently, the signal transmitting apparatus is able to set the appropriate correction magnitudes flexibly in response to the configuration of the signal transmission channels and their usage status after startup of the system.

Figure 13:
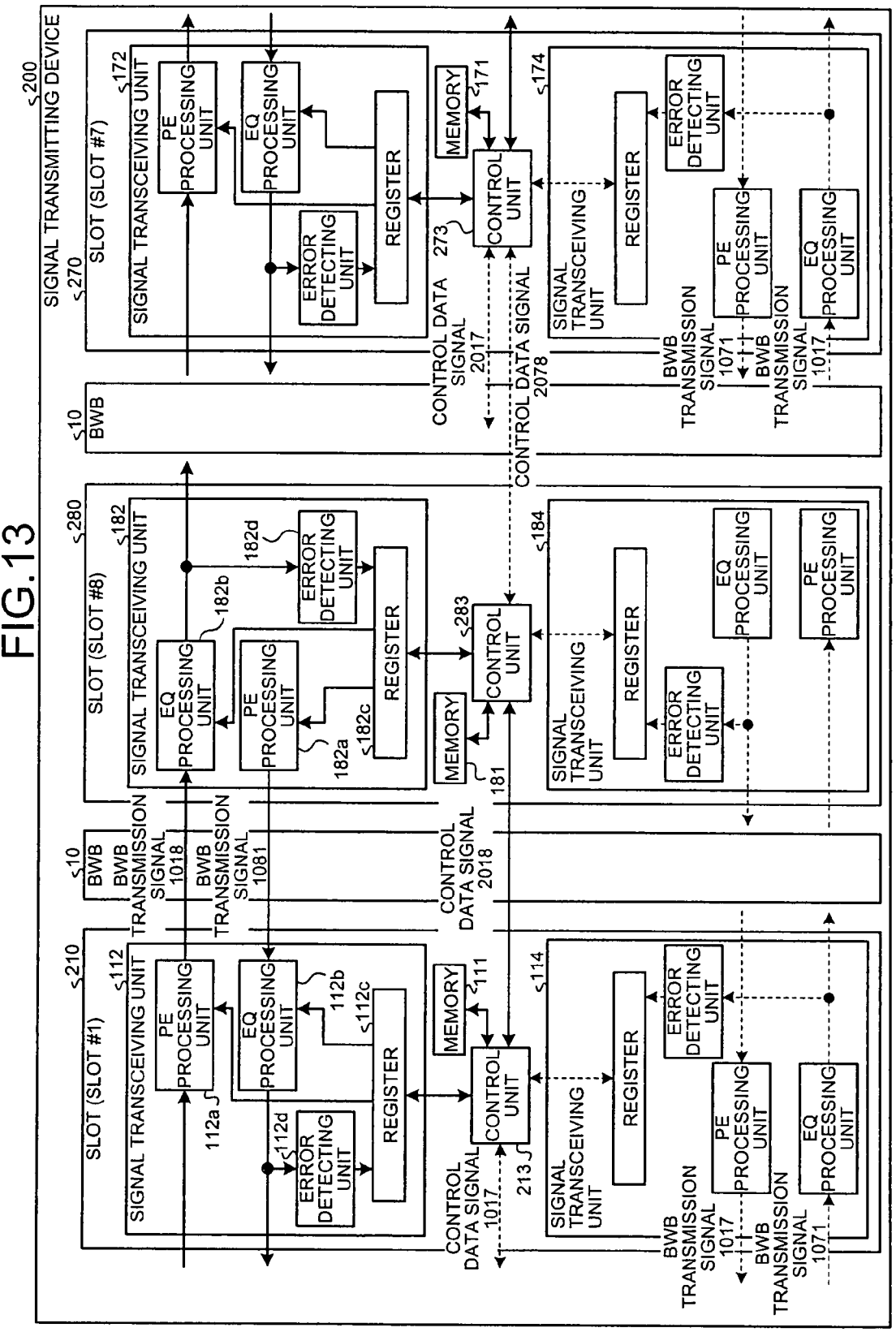
FIG. 13 is a functional block diagram of the signal transmitting apparatus according to the second embodiment.

A configuration of the signal transmitting apparatus according to the second embodiment is described below. FIG. 13 is a functional block diagram of the signal transmitting apparatus according to the second embodiment. For the sake of convenience, the parts that are functionally identical to those shown in FIGS. 5 and 6 have been assigned the same reference numeral and are not described again.

As shown in FIG. 13, a signal transmitting apparatus 200 includes a plurality of printed boards each of which performs a predetermined process, and the BWB 10 that has slots connecting the printed boards. For the sake of simplification, instead of the printed board itself, only the functional parts of the printed board are shown in FIG. 13.

In FIG. 13, only three slots, namely, slots 210 (slot #1), 270 (slot #7), and 280 (slot #8), are shown out of the eight slots of the BWB 10.

The slots 210, 270, and 280 are interfaces for insertion of the printed boards. A printed board that includes the memory 111, the signal transceiving units 112 and 114 and a control unit 213 is connected to the slot 210. Similarly, a printed board that includes a memory 171, signal transceiving units 172 and 174 and a control unit 273 is connected to the slot 270. Likewise, a printed board that includes a memory 181, signal transceiving units 182 and 184 and a control unit 283 is connected to the slot 280.

Only the BWB transmission signal transmitted and received by the printed boards connected respectively to the slots 210, 270, and 280 are different. Otherwise, the printed boards have the same configuration as far as the functional parts pertaining to the present invention includes. Hence, only the functional parts of the printed board connected to the slot 280 are described below, as the same description is applicable to the corresponding functional parts of the printed boards connected to the slots 210 and 270.

The memory 181 stores therein various kinds of data. In connection with the present invention, the memory 181 in advance has stored therein data in the form of the slot pairs and the equal-length groups in an associated form (see first embodiment).

The signal transceiving unit 182 controls the transmission and reception of the BWB transmission signals when the BWB transmission signals are transmitted between the slots 280 and 210. In connection with the present invention, the signal transceiving unit 182 includes the following functional parts, namely, a PE processing unit 182a, an EQ processing unit 182b, a register 182c, and an error detecting unit 182d.

Only the BWB transmission signal transmitted and received by the PE processing unit 182a, the EQ processing unit 182b, the register 182c, and the error detecting unit 182d are different. Otherwise, the functional parts are functionally identical to those described in the first embodiment and detailed explanation thereof is omitted.

The signal transceiving unit 184 controls the transmission and reception of the BWB transmission signal transmitted between the slot 280 and a not shown slot. Only the BWB transmission signal transmitted and received by the signal transceiving unit 184 is different from that of the signal transceiving unit 182. Otherwise, the configuration of the signal transceiving unit 184 is identical to that of the signal transceiving unit 182.

The control unit 283 controls the operation of the various functional units of the printed board connected to the slot 280 by executing various processes. In particular relevance to the present invention, the control unit 283 performs, for every equal-length group, an optimum setting value searching process to determine the optimum PE and EQ setting values during initial settings as well as after startup and to further calculate the difference in the optimum setting values with the next shorter equal-length group, and sets the determined optimum setting values in the PE processing unit and the EQ processing unit of the printed board connected to each slot. The optimum setting value searching process and an optimum setting value setting process according to the second embodiment, which includes the optimum setting value searching process, are described in detail later.

The optimum setting value setting process according to the second embodiment during initial settings and after startup is described below.

Figure 14:
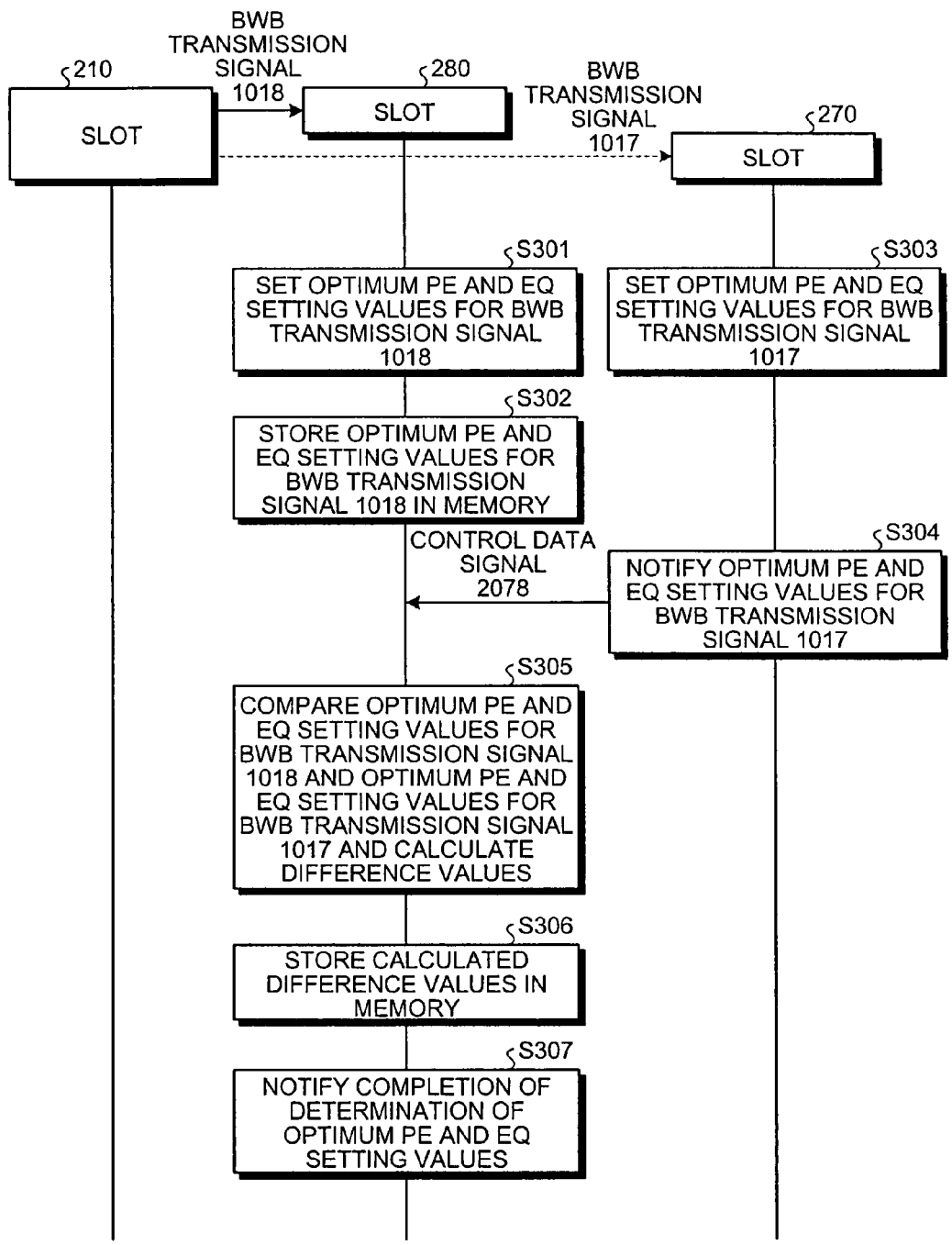
FIG. 14 is a sequence diagram of the optimum setting value setting process performed during initial settings by the signal transmitting apparatus according to the second embodiment.

The optimum setting value setting process during initial settings is described first. FIG. 14 is a sequence diagram of the optimum setting value setting process performed during initial settings by the signal transmitting apparatus 200 according to the second embodiment. As an example, the optimum PE and EQ setting values are determined for the BWB transmission signal 1018 transmitted from the slot 210 to the slot 280 shown in FIG. 13.

During initial settings prior to system startup, the signal transmitting apparatus 200 performs an optimum setting value searching process for the BWB transmission signal 1018. In other words, the control unit 283 of the printed board connected to the slot 280, which is the receiving side of the BWB transmission signal 1018, detects the error rate for every combination of PE and EQ setting values, and determines the optimum PE and EQ setting values based on the detected error rate. It is assumed that the optimum PE and EQ setting values determined by the control unit 283 are "3" and "3", respectively.

The control unit 283 sets the determined optimum PE and EQ setting values to the PE processing unit 112a of the slot 210 and the EQ processing unit 182b, respectively (see first embodiment for optimum setting value setting method) (step S301) as well as stores the optimum PE and EQ setting values in the memory 181 (step S302).

Similarly, the signal transmitting apparatus performs the optimum setting value searching process for the BWB transmission signal 1017. In other words, the control unit 273 of the printed board connected to the slot 270, which is the receiving side of the BWB transmission signal 1017, detects the error rate for every combination of PE and EQ setting values, and determines the optimum PE and EQ setting values based on the detected error rate. It is assumed that the optimum PE and EQ setting values determined by the control unit 273 are "2" and "3", respectively.

The control unit 273 sends a request to the slot 210 via the control data signal 1017 and sets the determined optimum PE and EQ setting values for the BWB transmission signal 1017 (see first embodiment for setting method) (step S303), and notifies the optimum PE and EQ setting values to the control unit 283 via a control data signal 2078 (step S304).

Upon receiving the optimum PE and EQ setting values, the control unit 283 retrieves the optimum PE and EQ setting values for the BWB transmission signal 1018 from the memory 181, compares the optimum PE and EQ setting values for the BWB transmission signal 1018 with the received optimum PE and EQ setting values for the BWB transmission signal 1017, and calculates the difference (by subtracting the optimum PE and EQ setting values for the BWB transmission signal 1017 from the optimum PE and EQ setting values for the BWB transmission signal 1018) (step S305). The control unit 283 derives "1" and "0" as a result.

The control unit 283 then stores the calculated difference in the memory 181 (step S306), and notifies the maintenance person that the optimum PE and EQ setting value searching process has ended (step S307).

Thus, in the signal transmitting apparatus 200 according to the second embodiment, by mutual notification of the optimum PE and EQ setting values among the slots, the control unit of each slot calculates, for each equal-length group, the difference in the PE and EQ setting values with the next shorter equal-length group, and stores the difference values in the memory of the respective slot.

Figure 15:
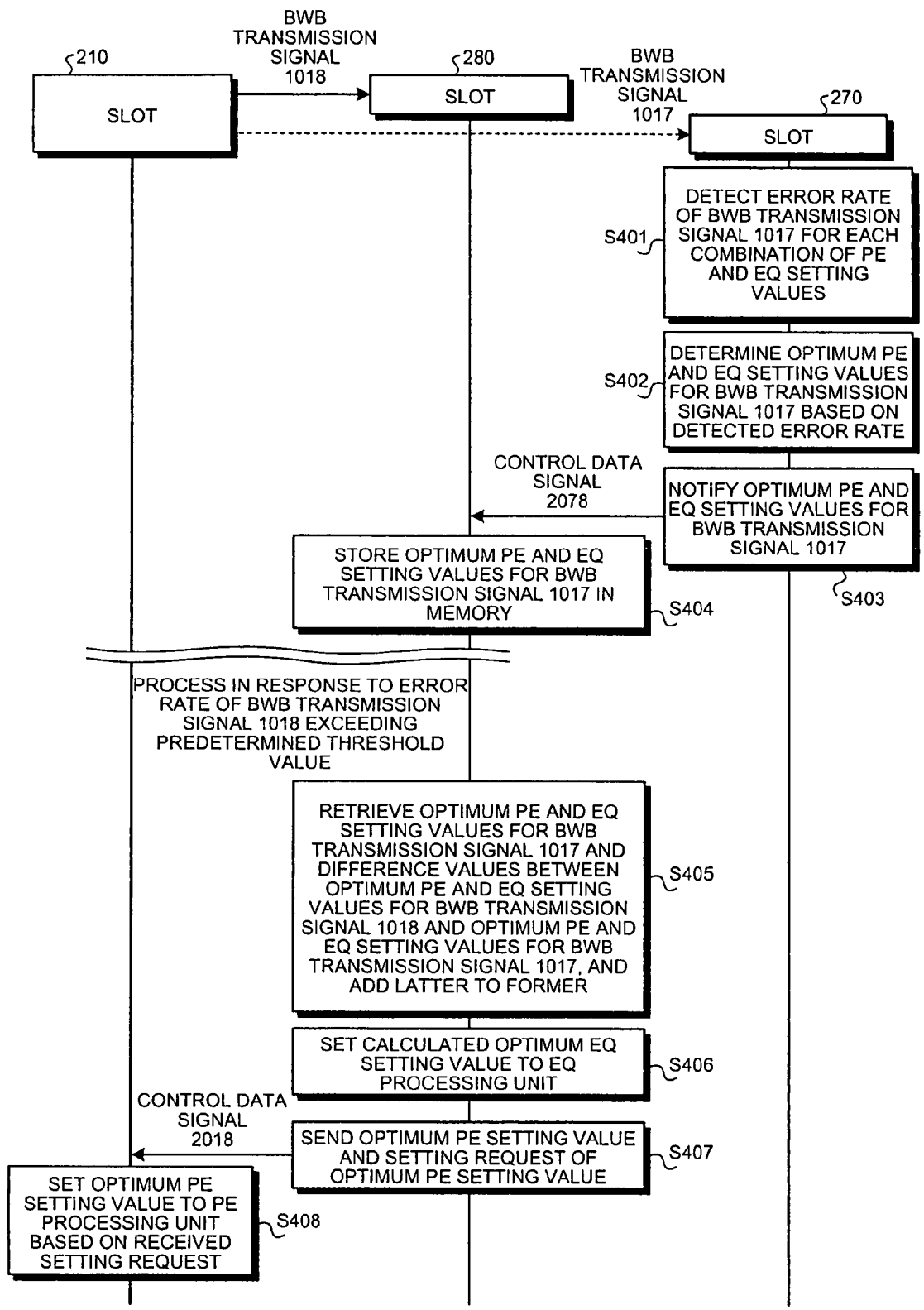
FIG. 15 is a sequence diagram of the optimum setting value setting process performed after startup by the signal transmitting apparatus according to the second embodiment.
Figure 16:
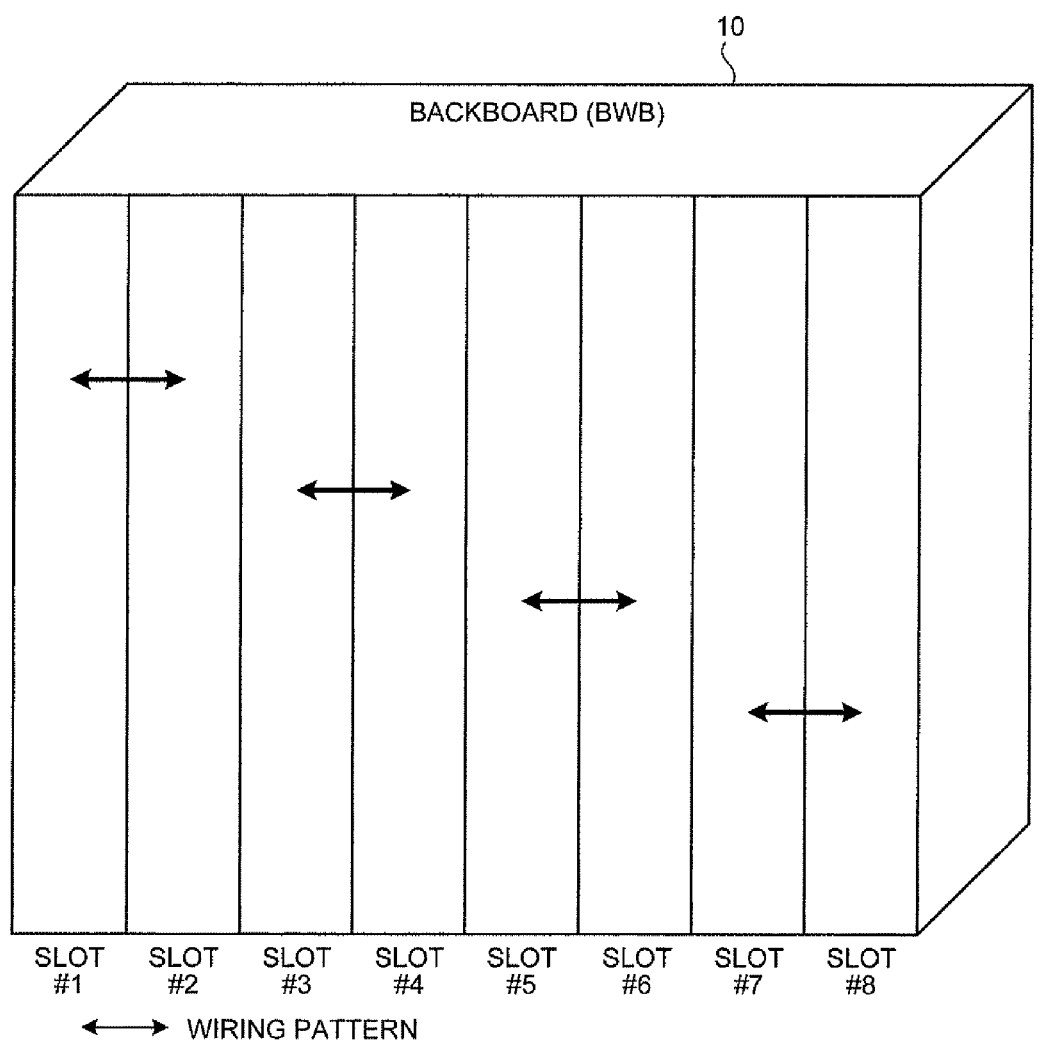
FIG. 16 is a schematic drawing of the BWB.
Figure 17A:
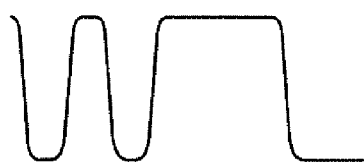
FIGS. 17A to 17D are drawings of waveforms for explaining pre-emphasis.
Figure 17B:
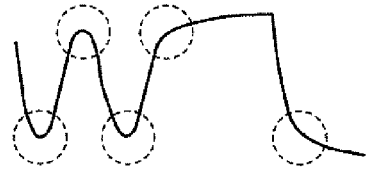
Figure 17C:
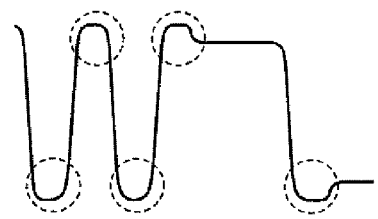
Figure 17D:
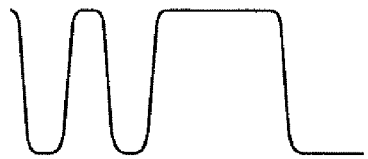
Figure 18A:
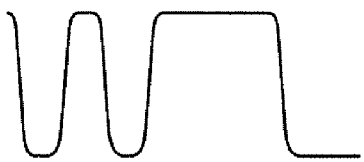
FIGS. 18A to 18D are drawings of waveforms for explaining equalizer.
Figure 18B:
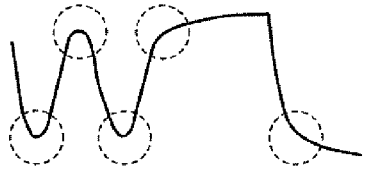
Figure 18C:
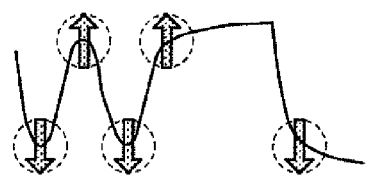
Figure 18D:
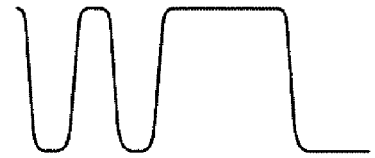

The optimum setting value setting process after startup is described below. FIG. 15 is a sequence diagram of the optimum setting value setting process performed after startup by the signal transmitting apparatus 200 according to the second embodiment.

It is assumed that in the signal transmitting apparatus 200 shown in FIG. 13, after startup, the BWB transmission signals 1018 and 1081 transmitted between the slots 210 and 280 are in use, and the BWB transmission signals 1017 and 1071 transmitted between the slots 210 and 270 are free, and that there are no free slot pairs among the slot pairs that belong to the same equal-length group as the slot pair formed by the slots 210 and 280.

After the signal transmitting apparatus 200 starts up, the control unit 273 of the slot 270 performs the optimum PE and EQ setting value setting process for the BWB transmission signal 1017. In other words, the control unit 273 detects the error rate for each combination of the PE and EQ setting values of the BWB transmission signal 1017 (step S401), and determines the optimum PE and EQ setting values for the BWB transmission signal 1017 based on the detected error rate (step S402).

The control unit 273 then notifies the determined optimum PE and EQ setting values for the BWB transmission signal 1017 to the control unit 283 of the slot 280 via the control data signal 2078 (step S403).

Upon receiving the optimum PE and EQ setting values for the BWB transmission signal 1017, the control unit 283 stores them in the memory 181 (step S404). Thus, the memory 181 always has stored therein the current optimum PE and EQ setting values for the BWB transmission signal 1017.

It is assumed that the error rate for the BWB transmission signal 1018 that is used after startup exceeds the predetermined threshold value due to ageing or temperature variations. The control unit 283 detects that the error rate has exceeded the threshold value, and retrieves the optimum PE and EQ setting values for the BWB transmission signal 1017 under the current environmental conditions from the memory 181. It is assumed that the optimum PE and EQ setting values for the BWB transmission signal 1017 retrieved by the control unit 283 are "1" and "1", respectively.

The control unit 283 then retrieves the difference values between the optimum PE and EQ setting values for the BWB transmission signal 1018 and the optimum PE and EQ setting values for the BWB transmission signal 1017. It is assumed that the control unit 283 retrieves "1" and "0" as the difference values of the optimum PE and EQ setting values, respectively.

The control unit 283 then adds the difference values to the optimum PE and EQ setting values for the BWB transmission signal 1017, and treats the resulting optimum PE and EQ setting values as the optimum PE and EQ setting values for the BWB transmission signal 1017 (step S405). Specifically, the control unit 283 adds "1" and "0" to "1" and "1", respectively, and treats the resulting "2" and "1" as the optimum PE and EQ setting values, respectively, for the BWB transmission signal 1017.

The control unit 283 then sets the calculated optimum EQ setting value to the EQ processing unit 182*b* (step S406), and sends a request to the control unit 213 via a control data signal 2018 to set the calculated optimum PE setting value to the PE processing unit 112*a* (step S407).

Upon receiving the memory access request, the control unit 213 sets the optimum PE setting value to the PE processing unit 112*a* based on the received setting request (step S408). Thus, the optimum PE and EQ setting values are set for the BWB transmission signal 1018.

As mentioned above, in the second embodiment, the signal transmitting apparatus stores the difference values of the PE and EQ setting values set for slot pairs connected by the wiring pattern of different lengths. If no free slot pair connected by a wiring pattern of same length as the specified signal transmission channel is available, the signal transmitting apparatus detects the error rate by transmitting the signal between a slot pair connected by a wiring pattern of a different length while changing the PE and EQ setting values of the signal. The signal transmitting apparatus then determines the optimum PE and EQ setting values for the signal based on the detected error rate and the stored difference values. Consequently, the signal transmitting apparatus determines the appropriate correction magnitudes without being affected by the configuration of the signal transmission channels and their usage after startup of the system.

The processes described in the first and second embodiments can also be implemented by execution of a ready computer program by a processing device such as a central processing unit (CPU), a micro control unit (MCU), or a micro processing unit (MPU), mounted on the printed board connected to each slot of the BWB 10.

For example, the computer program that implements the processes described in the first and second embodiments can be stored in the memory 111 of the printed board connected to the slot 110 shown in FIG. 5, and the computer program can be executed by the CPU mounted on the printed board to execute the various processes.

All the automatic processes explained in the first and second embodiments can be, entirely or in part, carried out manually. Similarly, all the manual processes explained in the first and second embodiments can be, entirely or in part, carried out automatically by a known method.

The process procedures, the control procedures, specific names, and data, including various parameters mentioned in the description and drawings can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

The process functions performed by the device can be entirely or partially realized by the CPU or a computer program executed by the CPU or by a hardware using wired logic.

According to an aspect of the present invention, corrections magnitudes can be set simultaneously to all the signal transmission channels belonging to one group. Consequently, it takes a short time to determine and set optimum correction magnitudes.

According to another aspect of the present invention, the optimum correction magnitudes can be set even after startup without interrupting operations.

According to still another aspect of the present invention, the optimum correction magnitudes can be set irrespective of a configuration of the signal transmission channels and their usage after startup of the system.

According to still another aspect of the present invention, the optimum correction magnitudes can be determined and set even if the system is configured to perform correction of the signal transmitted via the signal transmission channel during both transmission and reception.

According to still another aspect of the present invention, power consumption can be kept down, as larger correction magnitudes translate to higher power consumption.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for setting signal correction magnitude for a signal transmitting device where a plurality of communication device pairs are provided and each of the pairs is connected by one of signal transmission channels, the apparatus setting correction magnitudes of a signal transmitted via each of the signal transmission channels, the apparatus comprising:
a memory that stores equal-length group data obtained by grouping together equal-length signal transmission channels from among the signal transmission channels, the equal-length signal transmission channels being of equal length;
an error detecting unit that acquires error rates of a specified one of the signal transmission channels while changing the correction magnitudes of the signal; and
a control unit that retrieves correction magnitudes based on the error rates acquired by the error detecting unit, selects a signal transmission channel having the same length as that of the specified signal transmission channel based on the equal-length group data stored in the memory, and sets the retrieved correction magnitudes of the specified signal transmission channel as the correction magnitudes of the signal transmitted via the selected signal transmission channel.

2. The apparatus according to claim 1, wherein the error detecting unit confirms whether the specified signal transmission channel is in use, and acquires the error rates while changing the correction magnitudes of the signal transmitted via a signal transmission channel that is out of use and has the same length as that of the specified signal transmission channel, when it is confirmed that the specified signal transmission channel is in use.

3. The apparatus according to claim 2, further comprising a difference-data storage unit that stores difference data obtained by subtracting the correction magnitudes of signals set by the respective signal transmission channels having different lengths, wherein
the error detecting unit retrieves the error rates while changing the correction magnitudes of the signal transmitted via a signal transmission channel that is out of use and has a different length from that of the specified signal transmission channel, when there is no signal transmission channel that is out of use and has the same length as that of the specified signal transmission channel, and derives the correction magnitudes of the signal based on the acquired error rates and the difference data stored in the difference-data storage unit.

4. The apparatus according to claim 1, wherein the error detecting unit acquires transmission-signal error rates while changing transmission-signal correction magnitudes of a transmission signal transmitted via the signal transmission channel and reception-signal error rates while changing the reception-signal correction magnitudes received via the signal transmission channel, and
the control unit sets the transmission-signal correction magnitudes based on the transmission-signal error rates acquired by the error detecting unit and the reception-signal correction magnitudes based on the reception-signal error rates acquired by the error detecting unit.

5. The apparatus according to claim 4, wherein the control unit retrieves, from among the error rates acquired by the error detecting unit, the transmission-signal correction magnitudes and the reception-signal correction magnitudes the error rates of which are less than or equal to a predetermined threshold value, and, from among the retrieved transmission-signal correction magnitudes and reception-signal correction magnitudes, sets as the transmission-signal correction magnitudes and reception-signal correction magnitudes, respectively, the transmission-signal correction magnitudes and the reception-signal correction magnitudes whose respective sums are minimum.

6. A method for setting signal correction magnitude for a signal transmitting device where a plurality of communication device pairs are provided and each of the pairs is connected by one of signal transmission channels, the apparatus setting correction magnitudes of a signal transmitted via-a each of the signal transmission channels, the method comprising:
storing equal-length group data obtained by grouping together equal-length signal transmission channels from among the signal transmission channels, the equal-length signal transmission channels being of equal length;
acquiring error rates of a specified one of the signal transmission channels while changing the correction magnitudes of the signal; and
retrieving correction magnitudes based on the acquired error rates, selecting a signal transmission channel having the same length as that of the specified signal transmission channel based on the equal-length group data stored in the storing, and setting the retrieved correction magnitudes of the specified signal transmission channel as the correction magnitudes of the signal transmitted via the selected signal transmission channel.

7. The method according to claim 6, wherein the acquiring includes confirming whether the specified signal transmission channel is in use, and acquiring the error rates while changing the correction magnitudes of the signal transmitted via a signal transmission channel that is out of use and has the same length as that of the specified signal transmission channel, when it is confirmed that the specified signal transmission channel is in use.

8. The method according to claim 7, further comprising storing difference data obtained by subtracting the correction magnitudes of signals set by the respective signal transmission channels having different lengths, wherein
the acquiring includes acquiring the error rates while changing the correction magnitudes of the signal transmitted via a signal transmission channel that is out of use and has a different length from that of the specified signal transmission channel, when there is no signal transmission channel that is out of use and has the same length as that of the specified signal transmission channel, and deriving the correction magnitudes of the signal based on stored acquired error rates and difference data.

9. The method according to claim 6, wherein the acquiring includes acquiring transmission-signal error rates while changing transmission-signal correction magnitudes of a transmission signal transmitted via the signal transmission channel and reception-signal error rates while changing the reception-signal correction magnitudes received via the signal transmission channel, and
the setting includes setting the transmission-signal correction magnitudes based on the transmission-signal error rates acquired at the acquiring and the reception-signal correction magnitudes based on the reception-signal error rates acquired at the acquiring.

10. The method according to claim 9, wherein the retrieving includes retrieving, from among the error rates acquired at the acquiring, the transmission-signal correction magnitudes and the reception-signal correction magnitudes the error rates of which are less than or equal to a predetermined threshold value, and, from among the acquired transmission-signal correction magnitudes and reception-signal correction magnitudes, sets as the transmission-signal correction magnitudes and reception-signal correction magnitudes, respectively, the transmission-signal correction magnitudes and the reception-signal correction magnitudes whose respective sums are minimum.

11. A non-transitory computer-readable recording medium that stores therein a signal correction-magnitude setting program for a signal transmitting device where a plurality of communication device pairs are provided and each of the pairs is connected by one of signal transmission channels, the program causing a computer to set correction magnitudes of a signal transmitted via each of the signal transmission channels, the signal correction-magnitude setting program causing the computer to execute:
storing equal-length group data obtained by grouping together equal-length signal transmission channels from among the signal transmission channels, the equal-length signal transmission channels being of equal length;
acquiring error rates of a specified one of the signal transmission channels while changing the correction magnitudes of the signal; and
retrieving correction magnitudes based on the acquired error rates, selecting a signal transmission channel having the same length as that of the specified signal transmission channel based on the equal-length group data stored in the storing, and setting the retrieved correction magnitudes of the signals specified signal transmission channel as the correction magnitudes of the transmitted via the selected signal transmission channel.

* * * * *